United States Patent
Das et al.

(10) Patent No.: US 10,496,649 B1
(45) Date of Patent: *Dec. 3, 2019

(54) PERSONALIZED SUGGESTIONS BASED ON PAST QUERIES

(71) Applicant: Google Inc., Mountain View, CA (US)

(72) Inventors: Anwis Das, San Francisco, CA (US); Abhinandan Sujit Das, Cupertino, CA (US); Nitin Gupta, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 1148 days.

This patent is subject to a terminal disclaimer.

(21) Appl. No.: 14/038,163

(22) Filed: Sep. 26, 2013

Related U.S. Application Data

(60) Provisional application No. 61/838,269, filed on Jun. 22, 2013.

(51) Int. Cl.
*G06F 16/30* (2019.01)
*G06F 16/2457* (2019.01)

(52) U.S. Cl.
CPC .............................. *G06F 16/24578* (2019.01)

(58) Field of Classification Search
CPC .................................................. G06F 17/3053
See application file for complete search history.

(56) References Cited

U.S. PATENT DOCUMENTS

| | | | |
|---|---|---|---|
| 7,870,147 B2 | 1/2011 | Bailey et al. | |
| 7,984,004 B2 | 7/2011 | Andrew et al. | |
| 8,301,639 B1 * | 10/2012 | Myllymaki | G06F 17/3097 707/748 |
| 8,583,675 B1 | 11/2013 | Haahr et al. | |
| 2005/0234972 A1 * | 10/2005 | Zeng | G06F 17/30864 |
| 2009/0171929 A1 | 7/2009 | Jing et al. | |
| 2009/0187515 A1 * | 7/2009 | Andrew | G06F 17/3064 706/12 |
| 2010/0211588 A1 * | 8/2010 | Jiang | G06F 17/30637 707/768 |
| 2010/0228710 A1 | 9/2010 | Imig et al. | |
| 2011/0055189 A1 * | 3/2011 | Effrat | G06F 17/3064 707/706 |
| 2011/0072033 A1 | 3/2011 | White et al. | |

(Continued)

*Primary Examiner* — Tarek Chbouki
(74) *Attorney, Agent, or Firm* — Middleton Reutlinger

(57) ABSTRACT

Methods and apparatus for providing query suggestions to a user based on one or more past queries submitted by the user. Candidate query suggestions responsive to a current query may be identified. A candidate query similarity measure may be determined for a given candidate query suggestion based on matching entities related to the given candidate query suggestion and the one or more past queries. In some implementations the similarity measure may be based on cumulative entity scores of the matching entities that may optionally be based on at least one of inverse popularity of the matching entities, and how recent a past query is. In some implementations a ranking of the candidate query suggestions may be adjusted based on the similarity measure. A given candidate query suggestion may be selected as a query suggestion based on at least one of the adjusted ranking and the candidate query similarity measure.

24 Claims, 8 Drawing Sheets

(56) References Cited

U.S. PATENT DOCUMENTS

| | | | |
|---|---|---|---|
| 2011/0191364 A1* | 8/2011 | LeBeau | G06F 17/30672 |
| | | | 707/767 |
| 2011/0314021 A1 | 12/2011 | Gibbs et al. | |
| 2012/0036123 A1 | 2/2012 | Hasan et al. | |
| 2014/0156693 A1* | 6/2014 | Kritt | G06F 17/30796 |
| | | | 707/767 |
| 2014/0214822 A1* | 7/2014 | Sinha | G06F 17/3053 |
| | | | 707/731 |

* cited by examiner

| Entity | Popularity Measure for Entity (f) | $PQ_1$ | $PQ_2$ | $PQ_3$ | Cumulative Entity Scores based on | | Adjusted Cumulative Entity Score | | A |
|---|---|---|---|---|---|---|---|---|---|
| | | | | | Average $(PQ_1 + PQ_2 + PQ_3)/3 = ES_1$ | Weighted Sum based on Time $(w_1 = .6, w_2 = .8, w_3 = 1)$ $(PQ_1*w_1 + PQ_2*w_2 + PQ_3*w_3)/3 = ES_2$ | $ES_1*(1/f)$ Normalized | $ES_2*(1/f)$ Normalized | B |
| $E_1$ | 0.200 | 0.7 | 0.6 | 0.6 | 0.630 | 0.500 | 0.367 | 0.36 | C |
| $E_2$ | 0.250 | 0.0 | 0.3 | 0.3 | 0.200 | 0.180 | 0.093 | 0.10 | D |
| $E_3$ | 0.100 | 0.2 | 0.2 | 0.2 | 0.200 | 0.160 | 0.233 | 0.23 | E |
| $E_4$ | 0.025 | 0.1 | 0.0 | 0.1 | 0.066 | 0.053 | 0.307 | 0.31 | F |
| 1 | 2 | 3 | 4 | 5 | 6 | 7 | 8 | 9 | |

FIG. 4A

| Candidate Query Suggestion | Ranking Score (R) | $E_1$ | $E_2$ | $E_3$ | $E_4$ | Candidate Query Similarity Measure | | Adjusted Ranking Score | | | |
|---|---|---|---|---|---|---|---|---|---|---|---|
| | | | | | | Sum of Scores $ES_1$ of Matching Entities $= S_1$ | Sum of Scores $ES_1*(1/f)$ of Matching Entities $= S_2$ | $(R + S_1)$ | Boosted Score $S'_2 = 1/(1 - \sqrt{S_2})$ | $(R + S'_2)$ | B |
| $CQ_1$ | 15.00 | 0 | 0 | 0 | 1 | 0.066 | 0.307 | 15.066 | 2.24 | 17.24 | C |
| $CQ_2$ | 14.75 | 1 | 0 | 0 | 1 | 0.696 | 0.674 | 15.446 | 5.58 | 20.33 | D |
| ..... | ..... | 0 | 0 | 0 | 0 | 0.000 | 0.000 | ..... | ..... | ..... | E |
| $CQ_{49}$ | 2.00 | 1 | 1 | 0 | 1 | 0.830 | 0.764 | 2.830 | 8.05 | 10.05 | F |
| $CQ_{50}$ | 1.50 | 1 | 0 | 1 | 1 | 0.896 | 0.907 | 2.396 | 20.99 | 22.49 | G |
| 1 | 2 | 3 | 4 | 5 | 6 | 7 | 8 | 9 | 10 | 11 | |

FIG. 4B

PERSONALIZED SUGGESTIONS BASED ON PAST QUERIES

CROSS-REFERENCE TO RELATED APPLICATIONS

This application claims the benefit of U.S. Provisional Application Ser. No. 61/838,269, filed Jun. 22, 2013 and entitled "Personalized Suggestions Based on Past Queries", which is hereby incorporated by reference in its entirety.

BACKGROUND

This specification is directed generally to providing query suggestions to a user, and more particularly, to providing query suggestions to a user based on one or more past queries submitted by the user.

A user may submit a query to a search engine to locate information related to the query. When entering a query, a user may desire to have suggestions provided that are based on the entered query. For example, a user may enter a partial query and desire query suggestions to be provided that are based on the partial query.

SUMMARY

The present disclosure is directed to methods and apparatus for providing query suggestions to a user, and more particularly, to providing query suggestions to a user based on one or more past queries submitted by the user. Candidate query suggestions responsive to a current query may be identified. A candidate query similarity measure may be determined for a given candidate query suggestion based on matching entities related to the given candidate query suggestion and the one or more past queries. In some implementations the similarity measure may be based on cumulative entity scores of the matching entities that may optionally be based on at least one of inverse popularity of the matching entities, and how recent a past query is. In some implementations a ranking of the candidate query suggestions may be adjusted based on the similarity measure. A given candidate query suggestion may be selected as a query suggestion based on at least one of the adjusted ranking and the candidate query similarity measure.

For example, a user may have issued a past query for "rivers in Zambia". In one of the search results for the past query the user may see "Luapula river". The user may be interested in learning more about Luapula river and may start typing a current query such as "Lu". "Luapula river" may not by default be provided as a query suggestion in response to the partial query "Lu" due to, for example, a low ranking associated with the query suggestion "Luapula river". Based on techniques described herein, the entity associated with the river "Luapula river" may be identified as a past entity from the past query "rivers in Zambia". Based on identification of the entity associated with the river "Luapula River" as a past entity and based on the query suggestion "Luapula river" also being related to the entity associated with the river "Luapula River", the query suggestion "Luapula River" may be promoted as a query suggestion for the partial query "Lu". For example, the ranking associated with the query suggestion "Luapula River" may be promoted so that "Luapula River" is more likely to be provided as a query suggestion.

In some implementations a computer implemented method may be provided that includes the steps of: identifying a current query of a user; identifying one or more past queries of the user, the past queries issued prior to the current query; identifying one or more past entities related to one or more of the identified past queries; identifying one or more candidate query suggestions for the current query of the user; identifying, for each candidate query suggestion of the candidate query suggestions, one or more current entities related to the candidate query suggestion; selecting a given candidate query suggestion of the candidate query suggestions based on similarity between the one or more current entities related to the given candidate query suggestion and the one or more past entities related to the identified past queries; and providing the given candidate suggestion to the user as a query suggestion.

This method and other implementations of technology disclosed herein may each optionally include one or more of the following features.

In some implementations the one or more past queries may include a plurality of past queries and may further comprise determining whether the past queries are part of an on-topic query session. In some implementations selecting the given candidate query suggestion of the candidate query suggestions based on similarity between the one or more current entities related to the given candidate query suggestion and the one or more past entities related to the identified past queries may only occur if the past queries are determined to be part of an on-topic query session. In some implementations determining the past queries are part of an on-topic query session may further include identifying, for each of the past queries, one or more entities related to the past query, determining a similarity measure among the past queries based on similarity between the identified entities of the past queries, and determining the past queries are part of an on-topic query session if the similarity measure satisfies a threshold. In some implementations the identified entities for a first past query of the past queries may include one or more of the same entities as the identified entities for a second query of the past queries.

The method may further comprise determining, for each of the past entities, a cumulative ranking of the past entity based on a ranking of the past entity for each of the past queries. In some implementations selecting the given candidate query suggestion of the candidate query suggestions may further include identifying at least one matching entity between the past entities and the current entities and determining a query suggestion ranking of the given candidate query suggestion based on the cumulative ranking of the matching entity. In some implementations determining the cumulative ranking of the past entities based on the ranking of the past entities for each of the past queries may include weighting the ranking of the past entities for more recent of the past queries greater than the ranking of the past entities for less recent of the past queries. In some implementations the ranking of each of the past entities for each of the past queries may be based on a weighting of the past entity in search result documents responsive to the past query. The cumulative ranking of each of the past entities may be based on an overall popularity measure of the past entity indicative of overall popularity of the past entity, where, as the popularity measure becomes less indicative of popularity the cumulative ranking increases.

The past entities may be identified from a query to entity mapping.

The current entities may be identified from a query to entity mapping.

The past queries may immediately precede the current query.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein provide suggestions to a user based on entities related to one or more past queries by the user. Particular implementations of the subject matter described herein may determine an on-topic query session and may select one or more query suggestions based on the on-topic query session. Particular implementations of the subject matter described herein may provide the selected query suggestions to the user.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 4A is a table illustrating example methods of determining cumulative entity scores.

FIG. 4B is a table illustrating example methods of determining rankings for candidate query suggestions.

DETAILED DESCRIPTION

Figure 1:
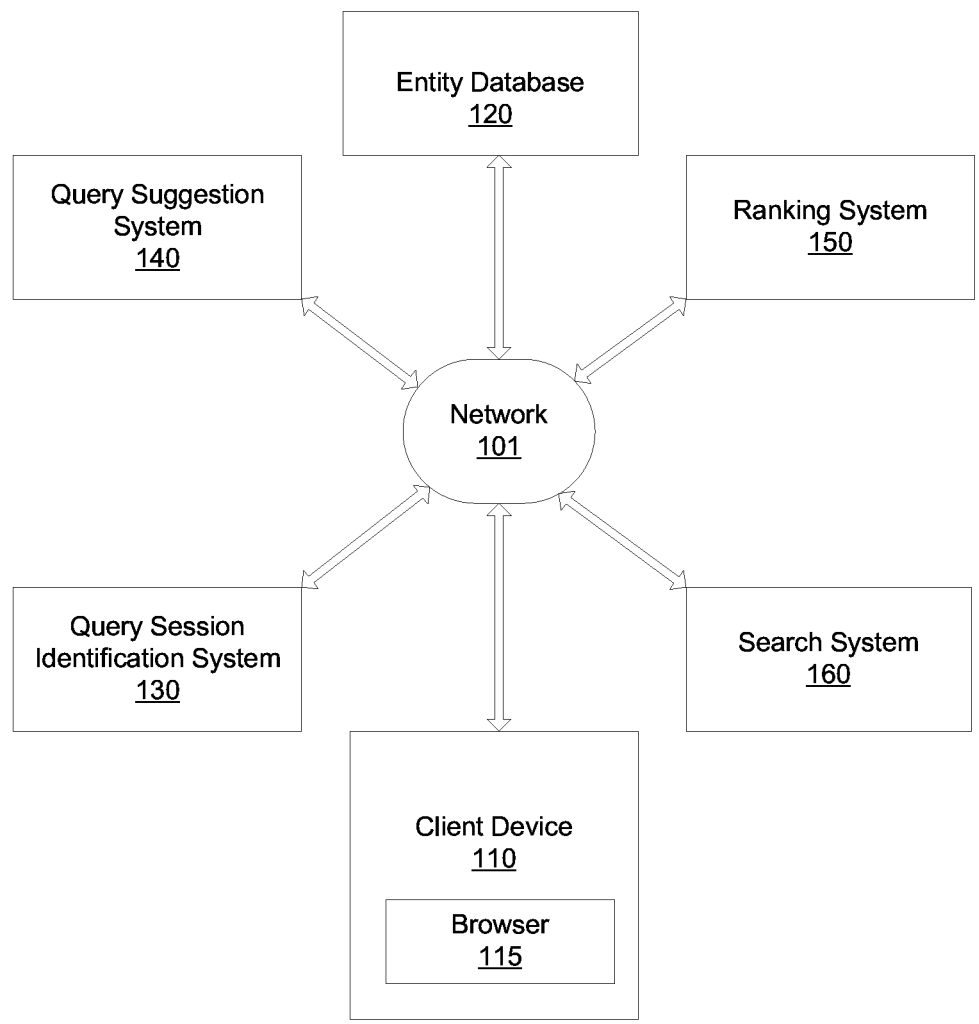
FIG. 1 illustrates a block diagram of an example environment in which one or more query suggestions are provided to a user in response to a current query.

FIG. 1 illustrates a block diagram of an example environment in which one or more query suggestions are provided to a user in response to a current query. The example environment of FIG. 1 may include a client device 110, an entity database 120, a query session identification system 130, a query suggestion system 140, a ranking system 150, and/or a search system 160. The environment may also include a communication network 101 that enables communication between various components of the environment. In some implementations the communication network 101 may include the Internet, one or more intranets, and/or one or more bus subsystems. The communication network 101 may optionally utilize one or more standard communications technologies, protocols, and/or inter-process communication techniques.

A user may interact with the search system 160 through a client device 110. The client device 110 may be, for example, a desktop computing device, a laptop computing device, a tablet computing device, a mobile phone, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device). Additional and/or alternative computing devices of the user may be provided. The client device 110 and the search system 160 each include memory for storage of data and software applications, a processor for accessing data and executing applications, and components that facilitate communication over a communication network 101. The operations performed by the client device 110 and/or the search system 160 may be distributed across multiple computer systems.

The client device 110 may execute one or more applications, such as web browsers (e.g., web browser 115), that enable the user to formulate queries and optionally submit completed queries to the search system 160. In some implementations queries may be submitted to the search system 160 from the client device 110. In some implementations queries may be submitted from the query session identification system 130 and/or other component to the search system 160.

The search system 160 is an example of an information retrieval system in which the systems, components, and techniques described herein may be implemented and/or with which the systems, components, and techniques described herein may interface. The search system 160 may receive queries from the client device 110 and/or other component and may return search results in response to the queries. For example, in response to a query from the client device 110, the search system 160 may provide a plurality of search results to be displayed in the web browser 115 that is executing on the client device 110. Each query may be a request for information. The query may be, for example, in a text form and/or in other forms such as, for example, audio form and/or image form. Other computing devices may submit search queries to the search system 160 such as a server implementing a service for a website that has partnered with the provider of the search system 160. For brevity, however, the examples are described in the context of the client device 110, the query session identification system 130, and/or the query suggestion system 140.

In some implementations the entity database 120 and/or the query session identification system 130 may access and/or store a list of past queries submitted by the user. A past query of a user is a query that was submitted by the user prior to a current query of the user. In some implementations the number of past queries of a user that are accessed and/or stored may be limited to a fixed number of past queries. For example, the query session identification system 130 may only access the past N queries of the user. For example, the user may sequentially submit the queries: "tourism in Africa", "weather in Africa", "rivers", "rivers in Africa", and "Zambezi river". The query session identification system 130 may only access the three most recent queries: "rivers", "rivers in Africa", and "Zambezi river". In some implementations the number of past queries accessed and/or stored may be limited to a certain passage of time. For example, the query session identification system 130 may only access the past queries of the user that were submitted within the last half hour. For example, the query session identification system 130 may access all the queries: "tourism in Africa", "weather in Africa", "rivers", "rivers in Africa", and "Zambezi river" if they were all submitted within the last half hour. In some implementations the query session identification system 130 may store time stamp data associated with the past queries. In some implementations the past queries may be ranked in the order in which they were submitted by the user.

In some implementations, the query suggestion system 140 may identify, for each past query, one or more past entities related to the past query. In some implementations, entities are persons, places, concepts, and/or things that may be referred to by a text fragment (e.g., a term or phrase) and are distinguishable from one another (e.g., based on context). For example, the past queries "perseus", "helena", and "Andromeda" may relate to the past entities related to characters from Greek mythology known as "Perseus", "Helena", and "Andromeda". In some implementations an entity may be related to a past query without an alias of the entity being present in the past query. For example, the entity associated with the Greek god "Zeus" is a past entity related to the past queries "perseus", "helena", and "Andromeda", but the entity associated with the Greek god "Zeus" does not appear as a past query. In some implementations, the query suggestion system 140 may identify one or more past entities related to a past query based on the search results and/or search result documents generated in response to the past query. For example, "Zeus" may appear in a search result summary in the search results generated in response to the submitted query "perseus".

A text segment such as a word and/or a phrase may potentially refer to multiple entities. For example, the text "andromeda" on a webpage may potentially refer to multiple entities such as the Greek mythological character, the galaxy, the science fiction television series, the software, the progressive metal band, or the techno-thriller movie "Andromeda Strain".

In some implementations the entity database 120 may include a database of structured data that includes nodes that represent entities and that identifies the type of each entity represented by a node. A node representing an entity may also be associated with metadata in the database of structured data (e.g., via links that represent properties of the entity). Any included metadata may include, for example, names/aliases for the entity, resource locators of search result documents that are about the entity, descriptive information about the entity, among other data. In some implementations the entity database 120 may include links between nodes and data that identifies the relationship between entities represented by linked nodes. In some implementations the entity database 120 may include an index of queries and associated entities. For example, for each query, a mapping (e.g., data defining an association) between the query and one or more entities related to the query may be identified in the entity database 120. An entity may be related to a query if present in search result documents responsive to the query.

In some implementations one or more aspects of information about an entity may be obtained from the entity database 120. In some implementations the query session identification system 130 may access the entity database 120 to identify stored associations between queries and entities. In some implementations the entity database 120 may be omitted. For example, in some implementations an association between a received query and one or more entities may be determined directly by the query session identification system 130 upon receipt of the query and may not be determined via accessing a database such as entity database 120.

In some implementations the entity database 120 may include an index of documents and associated entities. For example, for each of a plurality of documents, a mapping (e.g., data defining an association) between the document and one or more entities related with the document may be identified in the entity database 120. A document is any data that is associated with a document address. Documents may include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts).

In this specification, the term "database" will be used broadly to refer to any collection of data. The data of a database does not need to be structured in any particular way, or structured at all, and it may be stored on storage devices in one or more locations. Thus, for example, the entity database 120 may include multiple collections of data, each of which may be organized and accessed differently.

In some implementations the entity database 120 may be accessible to the query session identification system 130 in determining associations between a given past query and one or more entities related to the given past query. For example, the query session identification system 130 may associate an entity with a given past query based on association of the entity with one or more documents that are responsive to a search based on the given past query. In some implementations an association between a document and an entity may be based on presence of one or more properties of the entity in the document. For example, an association between a document and an entity may be based on an importance of one or more alias of the entity in the document. For example, appearance of an alias of an entity in important fields and/or with great frequency in a document may be indicative of association of the entity to the document.

Also, for example, an association between a document and an entity may be identified based on association between that entity and other entities in the document. For example, an entity may be associated with one or more additional entities based on co-occurrence of those entities in documents of a corpus of documents and/or based on other identified link such as hyperlinks between a document describing the entity and another document describing one of the additional entities. For example, a document may contain the term "Andromeda" and may also contain the term "galaxy". Based on an association between the entity that may be associated with the galaxy Andromeda and the entity representing the concept of galaxies, the entity that may be associated with the galaxy Andromeda may be identified as associated with the document.

Additional and/or alternative factors may be utilized in associating a document with one or more entities. For example, in some implementations one or more users may provide input to associate a document with one or more entities.

In some implementations the query session identification system 130 may group the past queries of a user into one or more on-topic query sessions. An on-topic query session of a user is a plurality of queries of the user that may be related to one or more similar topics. For example, the queries "rivers in Africa", "rivers in Zambia", "zambia", "Zambezi river", and "luapula river" may be identified as an on-topic query session based at least in part on a common topic related to rivers in Africa. As another example, the queries "perseus", "Helena", "greek mythology", "zeus", and "Andromeda" may be identified as an on-topic query session based at least in part on a common topic related to Greek mythological characters. Also, for example, the queries "galaxy", "milky way", "light year", "Sagittarius", "Andromeda", and "Andromeda galaxy" may be identified as an on-topic query session based at least in part on a common topic related to galaxies.

In some implementations the query session identification system 130 may identify an on-topic query session by determining similarities between the past queries based on similarity between the respective past entities of the past queries. In some implementations such determination may be based on a past query similarity measure between two or more past queries, the past query similarity measure indicative of the similarity between the respective past entities of the past queries. In some implementations each identified past entity may be associated with a ranking and the associated ranking may be optionally stored with the identified past entity in entity database 120. The ranking may be based on one or more factors. For example, the ranking may be based on an entity score for the past entity.

In some implementations the entity score for an entity may be based on a relationship between the past query related to the entity and the search result documents associated with the entity. For example, the entity score for a given entity may be based on query to document relevance scores for each of the one or more search result documents associated with the given entity. In some implementations the query to document relevance score for a given document may be based on one or more signals. Each signal may provide information about the document itself and/or the relationship between the document and the query. One example signal for a document for a query is the fraction of clicks for that query going to that document. Another example signal is a measure of the overall quality of the document. In some implementations the query to document score may be associated with a query and a document and stored in a database.

In some implementations a ranking between the entity and search result documents associated with the entity may be utilized in determining the entity score for an entity for a query. The ranking may be identified based on a database of documents and associated entities such as entity database 120. For example, for each of the identified documents, the entity database 120 may identify a ranking for one or more entities related to the document. For example, the entity database 120 may include entity to document relevance scores for each entity in each document. Each entity to document relevance score for a given entity in a given document may be indicative of the importance of the given entity in the given document. For example, in some implementations the entity to document relevance score may be based on frequency of appearance, location of appearance, and/or formatting applied to one or more occurrences of the entity in the document; and/or frequency of appearance, location of appearance, and/or formatting applied to one or more properties of the entity in the document. For example, an entity to document relevance score may be based on an importance of one or more alias of the entity in the document. Also, for example, appearance of an alias of an entity in important fields and/or with great frequency in a document may provide a score more indicative of importance of that entity in that document than if the entity occurred only in un-important fields and/or with little frequency. Also, for example, a score for an entity in a document may be based on presence of additional and/or alternative properties of the entity such as date of birth, place of birth, height, weight, population, geographic location(s), type of entity (e.g., person, actor, location, business, and university), etc.

In some implementations the query session identification system 130 may identify a ranking between the entity and the search result documents associated with the entity without accessing a database of documents and associated entities. For example, in some implementations an entity to document relevance score may be determined by the query session identification system 130 and/or ranking system 150 based on frequency of appearance, location of appearance, and/or formatting applied to one or more occurrences of the entity in the search result documents associated with the entity; frequency of appearance, location of appearance, and/or formatting applied to one or more properties of the entity in the search result documents associated with the entity; and/or other factors.

Additional and/or alternative factors may be considered in determining an entity to document relevance score. For example, the query session identification system 130 may obtain data that characterizes portions of the text of the documents as boilerplate content, (e.g., content that is reused in multiple search result documents). If the occurrence of the entity is in a portion of the text that has been characterized as boilerplate, the weight of the occurrence in that document may be decreased (e.g., so that an occurrence in a portion of the text that has been characterized as boilerplate has a lower weight than an occurrence in a portion of the text not characterized as boilerplate).

Another example factor that may be considered is the connectedness of the entity to the other entities referred to by aliases in the search result documents. For example, a connectedness score for an entity may be determined based on link scores between the entity and each other entity referred to in the search result documents. For example, link scores between entities may be obtained from a database such as entity database 120. In some implementations, once the entity to document relevance score for each entity in a given document have been determined, the entity to document relevance scores across the entities may be normalized (e.g., so that the entity to document relevance scores are reduced if there many different entities referenced in the search result documents).

The entity to document relevance scores for each of the documents associated with the entity may be utilized in determining the entity score. For example, an entity $E_1$ may be associated with search result documents $D_1$, $D_2$, and $D_3$ and the entity score for entity $E_1$ may be based on scores related to the relevance of the search result documents $D_1$, $D_2$, and $D_3$ to the entity. For example, the entity to document relevance score for entity $E_1$ may be based on summing the scores for the documents and/or averaging the scores for the documents. In some implementations the entity to document relevance scores for a given entity may be a number from zero to one.

In some implementations the entity score for an entity may be obtained by summing the product of the query to document relevance score times the entity to document relevance scores over all documents containing the entity. For example, an entity $E_1$ may be associated with search result documents $D_1$, $D_2$, and $D_3$ for a query; query to document relevance scores of $QD_1$, $QD_2$, and $QD_3$ may be obtained for those search result documents; and entity to document relevance scores of $ED_1$, $ED_2$, and $ED_3$ may be obtained for those search result documents. The entity score for the entity $E_1$ for the query may be $(QD_1*ED_1)+(QD_2*ED_2)+(QD_3*ED_3)$.

In some implementations a highest ranked entity of the entities for a query may be identified as a dominant entity for that query when the ranking of the highest ranked entity satisfies a threshold, such as a threshold relative to the ranking of a lower ranked entity of the entities. For example, if an entity score for a highest ranked entity of the entities satisfies a threshold relative to the ranking of a lower ranked entity of the entities (e.g., the second highest ranked entity), then it may be identified as a dominant entity for that query.

In some implementations a cumulative ranking of a past entity may be determined based on a ranking of the past entity for each of the past queries. For example, the past entity E may be related to past queries $Q_1$ and $Q_2$, and may be associated with entity scores $S_1$ and $S_2$, respectively. In such an instance, a cumulative ranking for the past entity E may be determined based on summing and/or averaging the respective entity scores $S_1$ and $S_2$.

In some implementations determining the cumulative ranking of the past entities based on the ranking of the past entities in each of the past queries includes weighting the ranking of the past entities for more recent of the past queries greater than the ranking of the past entities for less recent of the past queries. For example, the past query $Q_1$ may be submitted prior to the past query $Q_2$. The past entity E may be related to past queries $Q_1$ and $Q_2$ with entity scores $S_1$ and $S_2$, respectively. The entity scores may be weighted based on weights $w_1$ and $w_2$, respectively, where $w_1<w_2$, based on $Q_2$ being the more recent of the past queries $Q_1$ and $Q_2$. Accordingly, the cumulative ranking for the past entity E may be determined as $w_1 S_1 + w_2 S_2$, with $w_1<w_2$. In some implementations the weights may be appropriately normalized.

In some implementations the query session identification system 130 may identify an on-topic query session by determining similarities between the past queries based on similarity between the respective past entities of the past queries. In some implementations such determination may be based on a past query similarity measure between two or more past queries, the past query similarity measure indicative of the similarity between the respective past entities of the past queries.

In some implementations the past query similarity measure between a pair of past queries $Q_1$ and $Q_2$ may be determined based on the number of shared entities (e.g., entities that are common to both the past queries $Q_1$ and $Q_2$) between the past entities of $Q_1$ and $Q_2$. A higher number of shared entities between the past entities of $Q_1$ and $Q_2$ may be more indicative of similarity between the past queries $Q_1$ and $Q_2$ than a lower number of shared entities between the past entities of $Q_1$ and $Q_2$. For example, the first past query $Q_1$ may be related to past entities $E_{11}$, $E_{12}$, and $E_{13}$, with entity scores $S_{11}$, $S_{12}$, and $S_{13}$, respectively. The second past query $Q_2$ may be related to past entities $E_{21}$, $E_{22}$, $E_{23}$, and $E_{24}$, with entity scores $S_{21}$, $S_{22}$, $S_{23}$, and $S_{24}$, respectively. In a first scenario, entities $E_{12}$ and $E_{13}$ related to the past query $Q_1$ may be the same as entities $E_{23}$ and $E_{24}$ related to the past query $Q_2$. In a second scenario, entity $E_{12}$ related to the past query $Q_1$ may be the same as entity $E_{23}$ related to the past query $Q_2$. Accordingly, a past query similarity measure more indicative of similarity may be associated with $Q_1$ and $Q_2$ in the first scenario than in the second scenario.

In some implementations the past query similarity measure may be determined based on the entity scores of the matching entities. For example, entities $E_{12}$ and $E_{13}$ related to the past query $Q_1$ may be the same as entities $E_{23}$ and $E_{24}$, respectively, related to the past query $Q_2$. Accordingly, the past query similarity measure between $Q_1$ and $Q_2$ may be determined based on summing respective entity scores $S_{12}$ and $S_{13}$ and/or averaging the respective entity scores $S_{12}$ and $S_{13}$. In some implementations the average may be a weighted average. For example, when $S_{12}$ is equal to $S_{23}$ and $S_{13}$ is equal to $S_{24}$, the past query similarity measure between $Q_1$ and $Q_2$ may be determined as the sum and/or a weighted average of $S_{12}$ and $S_{13}$. In some implementations an entity may be associated with different entity scores for different queries. For example, the entity score $S_{12}$ associated with the entity $E_{12}$ (related to query $Q_1$) may not be equal to the entity score $S_{23}$ associated with $E_{23}$ (related to query $Q_2$) even though $E_{12}$ and $E_{23}$ may be the same entity. In such instances, the past query similarity measure between $Q_1$ and $Q_2$ may be determined as the sum and/or a weighted average of $S_{12}$, $S_{13}$, $S_{23}$ and $S_{24}$.

In some implementations the past query similarity measure between a pair of past queries may be identified by the query session identification system 130 by utilizing one or more methods including matching of the associated entities. Additional and/or alternative methods may be utilized such as methods based on determining similarities between respective search results and/or search result documents related to the entities. In some implementations determination of whether two or more past queries are similar may be based on exact matching and/or soft matching of their respective associated entities. In some implementations soft matching between entities may be based on determining relationship distance between the entities and comparing that to a threshold. For example, query session identification system 130 may access entity database 120 to identify links that associate the entities to one another and determine a relationship distance based on such associations.

Additional and/or alternative matching techniques may be utilized. For example, the past query similarity measure between a pair of past queries may be based on the semantic distance, or length of path along edges between the respective entities in an external resource such as WordNet. In some implementations a database such as entity database 120 may include distributionally similar entities and their corresponding distributional similarity scores. Entities that typically occur in similar contexts may, for example, be considered to have similar meanings. For example, a first entity from a first source that co-occurs with the same key terms as that of a second entity from a second source over a collection of documents (e.g., HTML documents and/or PDF documents) may be considered to be distributionally similar to the second entity. The distributional similarity of the given pair of past queries may be determined based on the distributional similarity scores of their respective past entities. For example, a larger number of distributionally similar past entities in the given pair of past queries may be indicative of a greater similarity between the past queries. Accordingly, a past query similarity measure more indicative of similarity may be associated with the given pair of past queries.

In some implementations the past query similarity measure between past queries may be based on determination of a cosine similarity between respective search result documents that are responsive to the past queries. Additional and/or alternative techniques may be used to determine the past query similarity measure between a pair of past queries. In some implementations the past entities may be identified from a query to entity mapping and the past query similarity measure between past queries may be based on comparison of the query to entity mappings for the respective entities related to the past queries. For example, in some implementations, the query session identification system 130 may associate a given past query with a past entity based on association of the past entity with the given past query in a query to entity mapping.

In some implementations the query session identification system 130 may identify an on-topic query session based on the past query similarity measures. For example, the user may have submitted past queries in the following order: "perseus", "zeus", "rivers", "rivers in Africa", "Zambezi river", "helena", and "Andromeda". The past queries "perseus", "zeus", "helena", and "Andromeda" may be identified as a first on-topic query session based on one or more techniques described herein. The past queries "rivers", "rivers in Africa", and "Zambezi river" may be identified as a second on-topic query session. In some implementations the second on-topic query session including "rivers", "rivers in Africa", and "Zambezi river" may be identified as an intervening on-topic query session with respect to the first on-topic query session including "perseus", "zeus", "helena", and "Andromeda". In some implementations one or more on-topic query sessions may be stored with time stamp data, and/or a list of intervening on-topic query sessions. In some implementations the past queries within each on-topic query session may be optionally ranked. In some implementations the ranking may be based on the order in which the past queries were submitted by the user.

In some implementations past queries may be identified as part of an on-topic query session if the past query similarity measure satisfies a threshold. For example, the past query similarity measure may be a score from 0 to 1 and the threshold for the past query similarity measure may be 0.85. A pair of past queries that have a past query similarity measure more than 0.85 may be identified as part of an on-topic query session. On the other hand, a pair of past queries that have a past query similarity measure less than 0.85 may be identified as part of different on-topic query sessions. For example, past queries "rivers in africa" and "Zambezi river" may be associated with a past query similarity measure 0.92, based at least in part on comparison of the past entities related to the past queries. Having satisfied the threshold of 0.85, these past queries may be identified as part of an on-topic query session. As another example, past queries "zeus" and "andromeda" may be associated with a past query similarity measure 0.95, based at least in part on comparison of the past entities related to the past queries. Having satisfied the threshold of 0.85, these past queries may be identified as part of an on-topic query session. Past queries "zeus" and "rivers in africa" may be associated with a past query similarity measure 0.15, based at least in part on past entities related to the past queries. Having failed to satisfy the threshold of 0.85, these past queries may not be identified as part of an on-topic query session.

Although aspects of the description provided herein are based on comparison of a pair of past queries, additional and/or alternative combinations of past queries may be utilized to identify a query session. For example, past queries may be compared three at a time. As another example, the past queries may be grouped into one or more statistically meaningful clusters based on their respective cumulative entity scores, and one or more clusters may be identified as query sessions.

Query suggestion system 140 may identify candidate query suggestions in response to a user's current query. In some implementations the current query may be a partial query. For example, the user may formulate a query on a web browser 115 and the query suggestion system 140 may identify candidate query suggestions. A partial query is a query formulated by a user prior to an indication by the user that the query is a completed query. The one or more applications executing on the client device 110 may provide partial queries being formulated by users, before the users have indicated completion of the queries. The applications may be, for example, a web browser, a toolbar running in a web browser, an e-mail application, a text-messaging application, and/or a search client running on the client device 110. In some implementations the applications provide each character of a query as it is typed or otherwise entered (e.g., spoken) by the user. In some implementations the applications provide multiple characters at a time, optionally following a pause by the user between character entries.

In some implementations a user may indicate a completed query by entering a carriage return and/or other character. In some implementations a user may indicate a completed query by selecting a search button or other submission button in a user interface presented to the user. In some implementations a user may indicate a completed query by speaking a command in a speech user interface. In some implementations a user may indicate a completed query by pausing more than a predetermined amount of time during entering of the query. Other forms of providing a partial query and/or indicating a completed query may additionally and/or alternatively be utilized.

In some implementations the client device 110 may facilitate entry of user input by providing query suggestions to the user in response to a partial query entered by a user. For example, when the user enters one or more characters, the query suggestion system 140 may identify candidate query suggestions that are selected using the one or more characters. In some implementations the candidate query suggestions that are identified may include words or phrases that include the one or more characters that were entered by the user. For example, complete words or extended phrases may be suggested for partial words or partial phrases that a user has entered (e.g., using a physical or virtual keyboard). The candidate query suggestions may also include words or phrases that are similar to (e.g., synonyms or spelling corrections of) the user input. In some implementations one or more query suggestions may be selected from the candidate query suggestions and provided to the user. The user may interact with (e.g., tap, click, or otherwise affirmatively select) one of the provided query suggestions to select the query suggestion.

In some implementations, in response to a partial query being entered at client device 110, the search system 160 receives the partial query and forwards the partial query to the query suggestion system 140. In some implementations, in response to a partial query being entered at client device 110, the one or more applications executing on the client device 110 may optionally forward the partial query to the query suggestion system 140. For example, in some implementations the browser 115 may forward the partial query to the query suggestion system 140. The query suggestion system 140 includes memory for storage of data and software applications, a processor for accessing data and executing applications, and components that facilitate communication over the communication network 101.

In some implementations the candidate query suggestions may include those determined based on a list of past user queries, a list of automatically generated queries, and/or real time automatically generated queries. For example, the query suggestion system 140 may use prefix based matching to identify candidate query suggestions from a list of past user queries. Any listing of past user queries and/or past automatically generated queries may optionally be stored in a database, for potential utilization as query suggestions and/or as a basis for query suggestions. Any entity annotations of the query suggestions may also optionally be stored and/or determined via query suggestion system 140.

In some implementations the candidate query suggestions may be based on additional and/or alternative factors such as the terms of the current query, an identifier of the user who submitted the current query, and/or a categorization of the user who submitted the current query (e.g., the geographic location from where the current query was submitted, the language of the user who submitted the current query, interests of the user who submitted the current query, and/or a type of the client device 110 used to submit the current query (e.g., mobile device, laptop, desktop)). The identification of the user may be, for example, a user name or the IP address of the client device 110. The geographic location from where the current query was submitted may be, for example, a continent, a country, a state, a city, or geographic coordinates, such as latitude and longitude.

In some implementations the query suggestion system 140 may, for each of the candidate query suggestions, identify one or more current entities related to the candidate query suggestion. In some implementations the query suggestion system 140 may, for a given candidate query suggestion, only identify a single current entity that may be related to therewith. In some implementations the single current entity related to a given candidate query suggestion may be the dominant entity related to the candidate query suggestion. For example, for each candidate query suggestion a single current entity may be related to the candidate query suggestion that is the highest ranking entity for that candidate query suggestion based on one or more rankings such as, for example an entity score for the given current entity for the given candidate query suggestion. In some implementations the entity database 120 may contain a mapping of one or more candidate query suggestions that each have multiple current entities associated therewith and the query suggestion system 140 may reduce the mapping by associating, for each candidate query suggestion, only a single dominant current entity therewith. For example, the entity database 120 may contain a mapping of one or more candidate query suggestions that each have multiple ranked current entities related to therewith and the query suggestion system 140 may generate a reduced mapping that only includes candidate query suggestions with each candidate query suggestion mapped to a single highest ranked current entity related to therewith. In some implementations the current entity related to a candidate query suggestion may be identified from current entities of such a reduced mapping.

In some implementations the ranking system 150 may determine a candidate query similarity measure for a given candidate query suggestion of the candidate query suggestions based on similarity between the one or more current entities related to the given candidate query suggestion and the one or more past entities related to the identified past queries. In some implementations a higher candidate query similarity measure may be more indicative of similarity between a past query and the given candidate query suggestion. Determination of such candidate query similarity measure may be based on one or more techniques described herein. For example, the candidate query similarity measure may be determined utilizing techniques similar to those used in determining the past query similarity measure. For example, the current entities related to the given candidate query suggestion may be compared to the past entities related to the one or more past queries to determine the candidate query similarity measure for the given candidate query suggestion.

In some implementations the candidate query similarity measure may be indicative of whether one or more of the current entities of the given candidate query suggestion match one or more of the past entities. If the given candidate query suggestion has one or more entities in common with the past entities, then the candidate query similarity measure may be 1; otherwise the candidate query similarity measure may be 0.

In some implementations the candidate query similarity measure may be based on the number of matching entities between the one or more current entities related to the given candidate query suggestion and the one or more past entities related to the identified past queries. In some implementations the candidate query similarity measure may be proportional to the number of matching entities between the one or more current entities related to the given candidate query suggestion and the one or more past entities related to the identified past queries. For example, one matching entity may be less indicative of similarity between a past query and the given candidate query suggestion than two matching entities.

In some implementations the candidate query similarity measure may be based on a popularity measure of the one or more current entities related to the given candidate query suggestion that match the one or more past entities related to the identified past queries. The popularity measure is indicative of the popularity of the given entity. For example, a higher popularity measure may be more indicative of popularity of the given entity. For example, the popularity measure associated with the entity that may be associated with the country "United States" may be more indicative of popularity than the popularity measure associated with the entity that may be associated with the country "Botswana". As another example, the popularity measure associated with the entity associated with the soccer player "Pele" may be more indicative of popularity than the popularity measure associated with the entity that may be associated with the soccer player "Palacio". In some implementations the popularity measure of the given entity may be based on a click-rate associated with the given entity (e.g., click-rate of documents associated with the given entity). For example, a higher popularity measure may be indicative of higher click-rate for the given entity. In some implementations the popularity measure of the given entity may be based on popularity of the given entity in a corpus of documents. For example, the corpus of documents may include a random corpus of documents such as a random selection of internet-based documents. Also, for example, the corpus of documents may include only the documents responsive to a search for the given entity. In some implementations the popularity measure may be based on a submission frequency of queries including an identifier of the entity. In some implementations the popularity measure may be stored in a database such as entity database 120.

In some implementations the candidate query similarity measure for the candidate query suggestion may be adjusted based on the popularity measures of the matching entities. This may enable promoting certain entities that are not highly popular, as relation of such entities to a query may be more meaningful than relation of a highly popular entity to a query. For example, a weighted average of the candidate query similarity measure and an aggregate popularity measure (of the matching entities) may be utilized to determine the candidate query similarity measure. An aggregate popularity measure may be a linear combination, a weighted average, a median, or some other statistically relevant average. For example, the candidate query similarity measure may be determined based on $w*(1/f)+(1-w)*s$, where w is a weight between zero and one, f is an aggregate popularity measure for the matching entities, and s is the candidate query similarity measure. A weight of one may correspond to a candidate query similarity measure based entirely on the popularity measure for the matching entities. A weight of zero may correspond to a candidate query similarity measure based entirely on the candidate query similarity measure.

In some implementations the candidate query similarity measure for the candidate query suggestion may be adjusted based on the popularity measures of the matching entities. For example, the entity associated with the continent "Africa" may be a matching entity between a past query "rivers in Zambia" and a candidate query suggestion "Tanzania". The entity associated with the river "Luapula river" may be a matching entity between a past query "rivers in Zambia" and a candidate query suggestion "Luangwa river". If this is the only matching entity, then the candidate query similarity measure for "Luangwa river" may equal 1. The entity associated with the river "Luapula river" may correspond to a low popularity measure (e.g., $f_1=0.01$), and accordingly, the candidate query similarity measure for "Luangwa river" may be adjusted by multiplying it with the reciprocal of the popularity measure (e.g., $s*(1/f_1)=1*(1/0.01)=100$). On the other hand, the entity that may be associated with the continent "Africa" may correspond to a high popularity measure (e.g., $f_2=100$), and accordingly, the candidate query similarity measure for "Tanzania" may be adjusted by multiplying it with the reciprocal of the popularity measure (e.g., $s*(1/f_2)=1*(1/100)=0.01$).

As another example, when there are two matching entities, for example, entity C and entity D, between the current entities related to a candidate query suggestion $Q_3$ and the past entities of the past queries, then the candidate query similarity measures may equal 2. In this instance, entities C and D may be associated, for example, with popularity measures $f_C=0.025$ and $f_D=0.1$ respectively. Based on a comparison of their respective popularity measures, each of entities C and D, with popularity measures $f_C=0.025$ and $f_D=0.1$ respectively, may be determined to be more popular than entity A with popularity measure $f_A=0.01$. However, the candidate query similarity measure for the candidate query suggestion $Q_3$ may be determined as $s*(1/f_C+1/f_D)=2*(40+10)=100$, which is the same as the candidate query similarity measure for the candidate query suggestion $Q_1$ determined when there was one matching entity A with popularity measure $f_A=0.01$.

In some implementations the candidate query similarity measure may be a real number. In some implementations the candidate query similarity measure may be normalized to a real number between zero and one. In some implementations a candidate query similarity measure of one may be indicative of a maximum measure of similarity between the candidate query suggestion and the one or more past queries. On the other hand, a candidate query similarity measure of zero may be indicative of a minimum measure of similarity between the candidate query suggestion and the one or more past queries. In some implementations the query suggestion system 140 may additionally and/or alternatively adjust the candidate query similarity measure based on one or more techniques disclosed herein.

In some implementations the candidate query suggestions may be ranked based on the candidate query similarity measures. In some implementations the given candidate query suggestion of the candidate query suggestions may be selected as a query suggestion if the candidate query similarity measure of the given candidate query suggestion satisfies a threshold. For example, in some implementations where the ranking is based on the candidate query similarity measure for the candidate query suggestion and a higher score is associated with a higher ranking, the threshold may be satisfied if the candidate query similarity measure of the candidate query suggestion exceeds the threshold. In some implementations the top N candidate query suggestions may be selected as query suggestions to be provided to the user.

In some implementations one or more of the candidate query suggestions may be associated with a ranking based on one or more factors that are distinct from the candidate query similarity measure based on matching entities as described herein. For example, the candidate query suggestions may be identified from a ranked list of past user queries, and/or a ranked list of automatically generated queries. The ranked list may be ranked based on factors such as an overall popularity score for the candidate query suggestions, and/or a popularity score for the candidate query suggestions for the entered query for which they are identified. Accordingly, the ranking for the candidate query suggestions may be identified from the respective ranked lists. As another example, the ranking of the identified candidate query suggestions may be based on the user who submitted the current query, and/or a categorization of the user who submitted the current query (e.g., the geographic location from where the current query was submitted, the language of the user who submitted the current query, interests of the user who submitted the current query, and/or a type of the client device 110 used to submit the current query (e.g., mobile device, laptop, desktop)). In some implementations the query suggestion system 140 may access a database such as entity database 120 to identify such ranking of identified candidate query suggestions.

In some implementations the ranking of a given candidate query suggestion may be adjusted based on the candidate query similarity measure for the given candidate query suggestion. For example, the given candidate query suggestion may be associated with a ranking score r and a candidate query similarity measure s. The ranking of the given candidate query suggestion may be adjusted based on a weighted average of the ranking score r and the candidate query similarity measure s, $p \cdot r+(1-p)s$. When p is equal to 0, the ranking may be based only on the candidate query similarity measure s; when p equals 1, the ranking may be based only on the ranking score r.

In some implementations the adjusted ranking may be based on the sum of the ranking score r and the candidate query similarity measure s. For example, candidate query suggestion $Q_1, Q_2, \ldots, Q_{50}$ may be identified by the query suggestion system 140. The candidate query suggestions may be associated with ranking scores, for example, in the order of diminishing values, $r_1=0.8, r_2=0.75, \ldots, r_{50}=0.01$. The candidate query suggestions may be additionally associated with candidate query similarity measures $s_1=0, s_2=0, \ldots, s_{49}=0, s_{50}=1$, indicating that the candidate query suggestions $Q_1, Q_2, \ldots, Q_{49}$ do not have entities in common with the past entities, and candidate query suggestion $Q_{50}$ may have one or more entities in common with the past entities. Accordingly, the adjusted ranking scores may be determined by taking the sums of the respective ranking scores and candidate query similarity measures to be 0.8, 0.75, ..., 1.01, respectively. Based at least in part on such adjusted ranking scores, candidate query suggestion $Q_{50}$ may be promoted as the highest ranked query suggestion.

As another example, the candidate query similarity measure for the given candidate query suggestion may be indicative of the number of matching entities, and the ranking of the given candidate query suggestion may be adjusted based on adding the ranking score for the given candidate query suggestion to the number of matching entities. For example, query $Q_1$ may have one entity in common with the past entities and query $Q_{50}$ may have three entities in common with the past entities. Queries $Q_2, \ldots, Q_{49}$ may not have any entities in common with the past entities. Accordingly, the adjusted ranking scores may be determined by taking the sums of the respective ranking scores and candidate query similarity measures to be 1.8, 0, . . . , 0, 2.01, respectively. Based at least in part on such adjusted ranking scores, candidate query suggestion $Q_{50}$ may be promoted as the highest ranked query suggestion, followed by the candidate query suggestion $Q_1$. In some implementations $Q_2, \ldots, Q_{49}$ may not be provided as suggested queries by the query suggestion system 140.

In some implementations the ranking score r may be multiplied by the candidate query similarity measure s. The ranking of the given candidate query suggestion may be adjusted based on r*s. For the example above, the adjusted ranking scores may be determined by taking the products of the respective ranking scores and candidate query similarity measures to be 0, 0, . . . , 0.01, respectively. Based at least in part on such adjusted ranking scores, candidate query suggestion $Q_{50}$ may be promoted as the highest ranked query suggestion. As another example, the candidate query similarity measure for the given candidate query suggestion may be indicative of the number of matching entities, and the ranking of the given candidate query suggestion may be adjusted based on multiplying a ranking score for the given candidate query suggestion with the number of matching entities. For example, query $Q_1$ may have one entity in common with the past entities and query $Q_{50}$ may have three entities in common with the past entities. Queries $Q_2, \ldots, Q_{49}$ may not have any entities in common with the past entities. Accordingly, the adjusted ranking scores may be determined by taking the products of the respective ranking scores and candidate query similarity measures to be 0.8, 0, . . . , 0, 0.02, respectively. Based at least in part on such adjusted ranking scores, candidate query suggestion $Q_1$ may be promoted as the highest ranked query suggestion, followed by the candidate query suggestion $Q_{50}$. In some implementations $Q_2, \ldots, Q_{49}$ may not be provided as suggested queries by the query suggestion system 140.

In some implementations the given candidate query suggestion of the candidate query suggestions may be selected as a query suggestion if the adjusted ranking of the given candidate query suggestion satisfies a threshold. For example, in some implementations where the ranking is based on the adjusted ranking score associated with the candidate query suggestion and a higher score is associated with a higher ranking, the threshold may be satisfied if the adjusted ranking score of the candidate query suggestion exceeds the score of a threshold value. In some implementations the top N candidate query suggestions may be selected as query suggestions to be provided to the user.

In some implementations the candidate query similarity measure may be further boosted by applying an appropriate boost transformation. The boost transformation may amplify the effect of small perturbations in the candidate query similarity measures for candidate query suggestions. For example, the candidate query similarity measure s may be boosted by a transformation such as:

$$\frac{1}{1-\sqrt{s}}.$$

A small change in the value of the candidate query similarity measure may result in a large change in the boosted candidate query similarity measure. For example, for s=0.95, the boosted candidate query similarity measure may be determined as 39.49; and for s=0.96, the boosted candidate query similarity measure may be determined as 49.49. Accordingly, a small change in the candidate query similarity measure may correspond to a large change in the boosted candidate query similarity measure. In some implementations the boost transformation may only be applied to the top N highly ranked candidate query suggestions based on the candidate query similarity measure and the existing ranking may be adjusted only for such highly ranked candidate query suggestions.

For example, the existing ranking scores for three candidate query suggestions $CQ_1$, $CQ_2$, and $CQ_3$ may be identified as 25, 10, and 5, and the candidate query similarity measures may be determined as 0.1, 0.95 and 0.96, respectively. Candidate query similarity measures for $CQ_2$, and $CQ_3$ may be identified as being associated with the top two candidate query similarity measures. The boost transformation may be applied to the candidate query similarity measures for $CQ_2$, and $CQ_3$ to obtain adjusted candidate query similarity measures 39.49 and 49.49 respectively. Accordingly, the existing ranking scores for $CQ_1$, $CQ_2$, and $CQ_3$ may be adjusted as 25, 39.49 and 49.49 respectively. Based at least in part on such adjusted ranking, the candidate query suggestions may be ranked as $CQ_3$, $CQ_2$, and $CQ_1$, and provided to the user in that order.

In some implementations the boost transformation may only be applied to the candidate query similarity measure for $CQ_3$. Accordingly, the existing ranking scores for $CQ_1$, $CQ_2$, and $CQ_3$ may be adjusted as 25, 10, and 49.49 respectively. Based at least in part on such adjusted ranking, the candidate query suggestions may be ranked as $CQ_3$, $CQ_1$, and $CQ_2$, and provided to the user in that order. In some implementations the adjusted ranking for $CQ_2$ may fail to satisfy a threshold and $CQ_3$ and $CQ_1$ may be provided to the user in that order, optionally with additional query suggestions. In some implementations the boost transformation may be applied to the candidate query similarity measure for each candidate query suggestion. In some implementations the candidate query suggestions may be ranked based on the boosted candidate query similarity measures. In some implementations a given candidate query suggestion of the candidate query suggestions may be selected as a query suggestion if the boosted candidate query similarity measure of the given candidate query suggestion satisfies a threshold. For example, in some implementations where the ranking is based on the boosted candidate query similarity measure associated with the candidate query suggestion and a higher score is associated with a higher ranking, the threshold may be satisfied if the boosted candidate query similarity measure of the candidate query suggestion exceeds the score of a threshold value.

In some implementations the query suggestion system 140 may optionally determine whether the given candidate query suggestion may be included in an identified on-topic query session. Such determination may be based on one or more techniques disclosed herein to identify an on-topic query session for past queries. For example, current entities related to the given candidate query suggestion may be compared to the past entities related to the past queries included in the identified on-topic query session to determine if a threshold is satisfied. In some implementations a candidate query similarity measure may be determined based on a comparison of the respective entities for each identified query session. The candidate query suggestion may be determined to be in an identified query session if the candidate query similarity measure satisfies a threshold.

For example, the user may have issued past queries for "rivers in africa" followed by "rivers in zambia". The query session identification system 130 may identify past entities related to the categories "rivers", and "rivers in Africa"; the entities related to the rivers "Zambezi river", "Kafue River", "Luapula River", "Luangwa River", and "Kalambo River"; the entity that may be associated with the continent "Africa"; the entity that may be associated with the country "Zambia"; and the entity that may be associated with the National Park "South Luangwa National Park", among others. Based at least in part on these past entities, the query session identification system 130 may identify the past queries "rivers in africa" and "rivers in zambia" as being included in an on-topic query session. In one of the search result snippets responsive to the past query "rivers in zambia", the user may see "Luapula River". The user may be interested in learning more about Luapula River and may start typing a current query such as "Lu". The query suggestion system 140 may identify "Luapula River", "lululemon", "luke bryan", "lumosity", and "Luangwa River" as candidate query suggestions. The query session identification system 130 may identify current entities related to each candidate query suggestion. For example, the candidate query suggestion "Luapula River" may be related to current entities including the entity that may be associated with the continent "Africa"; the entity that may be associated with the country "Zambia"; the entities related to the geographical regions "Congo", "Bangweulu Swamps", and "Luapula Province"; and so forth. Based at least in part on comparison of the current entities with the past entities, the query session identification system 130 may identify the candidate query suggestion "Luapula River" as part of the identified on-topic query session. Likewise, the candidate query suggestion "Luangwa River" may be identified as part of the identified on-topic query session.

On the other hand, the current entities related to the candidate query suggestion "lululemon" may include entities related to yoga attire and not include any entities related to the identified past entities. Based at least in part on comparison of such current entities with the identified past entities, the query session identification system 130 may determine that the candidate query suggestion "lululemon" is not a part of the identified on-topic query session. Likewise, the current entities related to the candidate query suggestion "luke bryan" may include entities related to the country singer Thomas Luther "Luke" Bryan and not include any entities related to the identified past entities. Based at least in part on comparison of such current entities with the identified past entities, the query session identification system 130 may determine that the candidate query suggestion "luke bryan" is not a part of the identified on-topic query session. As another example, the current entities related to the candidate query suggestion "lumosity" may include entities related to brain-training games and/or neuroscience and not include any entities related to the identified past entities. Based at least in part on comparison of such current entities with the identified past entities, the query session identification system 130 may determine that the candidate query suggestion "lumosity" is not a part of the identified on-topic query session.

In some implementations the query suggestion system 140 may determine that "lululemon", "luke bryan", and "lumosity" may not be selected as query suggestions to be provided to the user in response to the partial query "Lu". In some implementations the query suggestion system 140 may determine that "Luapula River" and "Luangwa River" may be provided to the user in response to the partial query "Lu".

In some implementation the selected query suggestions may be provided to a user via a computing device 110. In some implementations the selected query suggestions may be presented within a user-editable field as a menu option; presented as a pop-up window; presented as a drop-down menu; and/or may appear in a box. The box may be positioned anywhere on the display, such as a side panel or overlaid onto the user-editable document. In some implementations the selected query suggestions may become visible as user-initiated activity is detected in a search box. In some implementations the number of selected query suggestions displayed may depend on the computing device 110. For example, fewer selected query suggestions may be displayed on a mobile device than may be displayed on a desktop device.

In some implementations the query suggestion system 140 may determine that some selected query suggestions are not relevant to user intent and eliminate these selected query suggestions from further consideration. For example, the query suggestion system 140 may determine that not all the selected query suggestions are logical, useful, or valid suggestions, and may eliminate those that are not. Also, for example, the query suggestion system 140 may exclude some selected query suggestions if they have not resulted in past selection by users. This exclusion may be based on some predetermined threshold. Such exclusion helps to avoid providing selected query suggestions that have historically been of little interest to the user or a group of users.

In some implementations the query suggestion system 140 may identify entities that have a popularity measure indicative of high popularity and eliminate such entities in identification of current and/or past entities. In some implementations such entities that have a popularity measure indicative of high popularity may be additionally and/or alternatively not identified as candidate query suggestions and/or not selected as query suggestions.

Figure 2A:
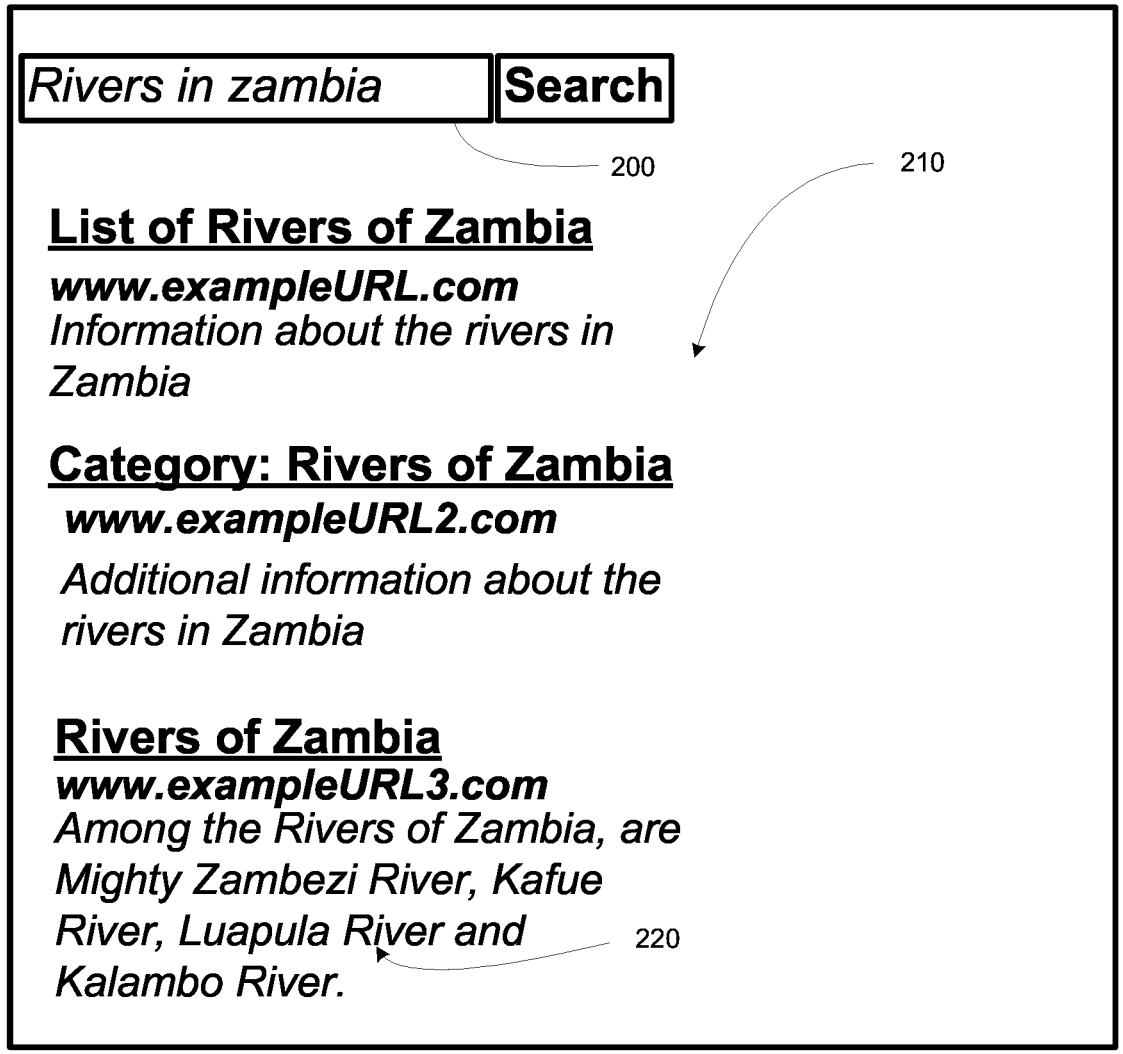
FIG. 2A illustrates an example graphical user interface for displaying search results in response to a query.

FIG. 2A illustrates an example graphical user interface for displaying search results in response to a query. For example, the user may have issued a past query 200, "rivers in zambia". The search system 160 may receive the past query 200 from the client device 110 and/or other component and may return search results 210 in response to the past query 200. For example, in response to the past query 200 from the computing device 110, the search system 160 may provide a plurality of search results 210 to be displayed in the web browser 115 that is executing on the client device 110. The user may detect "Luapula River" 220 as one of the entities displayed among the search results 210. Other entities that may appear in the search results may include, for example, the entity that may be associated with the country "Zambia", and the entities related to the rivers "Zambezi River", "Kafue River", and "Kalambo River". The past entities related to the past query 200 may include an entity for which an alias of the entity may not be present in the search results. For example, the past entities may include entities related to the continent "Africa", the geographical region "continent", without the aliases "Africa", "continent" appearing in the search results. In some implementations the user may type a current query "lu" to learn more about the Luapula River.

Figure 2B:
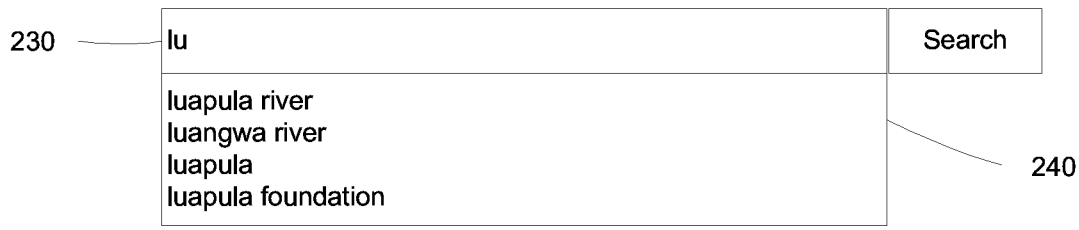
FIG. 2B illustrates an example graphical user interface for displaying query suggestions in response to a partial query.

FIG. 2B illustrates an example graphical user interface for displaying query suggestions in response to a partial query. In some implementations the query suggestion system 140 may provide query suggestions 240 for display in and/or adjacent to a search field. For example, the query suggestion system 140 may provide query suggestions 240 as a user is formulating a partial query 230 as illustrated. For example, the user may be formulating a query "lu" to learn more about the Luapula River. Based on the past query "rivers in zambia" the query session identification system 130 may identify past entities including the entity that may be associated with the continent "Africa"; the entity that may be associated with the country "Zambia"; entities that may be associated with the rivers "Zambezi River", "Kafue River", "Luapula River", "Kalambo River", and "Luangwa River"; and the entity that may be associated with the National Park "South Luangwa National Park"; among others. Based on the partial query 230, the query suggestion system 140 may identify "Luapula River", "lululemon", "luke bryan", "lumosity", "luapula", "luapula foundation" and "Luangwa River" as candidate query suggestions, based at least in part on the partial query beginning with the letters "l" and "u". In some implementations, based at least in part on techniques disclosed herein, the query suggestion system 140 may select "luapula river", "luangwa river", luapula", and "luapula foundation" as query suggestions that may be provided to the user as query suggestions 240 in response to the partial query "lu". In some implementations the query suggestions 240 may be provided via a drop-down menu from the search box as illustrated. In some implementations the user may interact with (e.g., tap, click, or otherwise affirmatively select) one of the provided query suggestions to select the query suggestion.

Figure 3A:
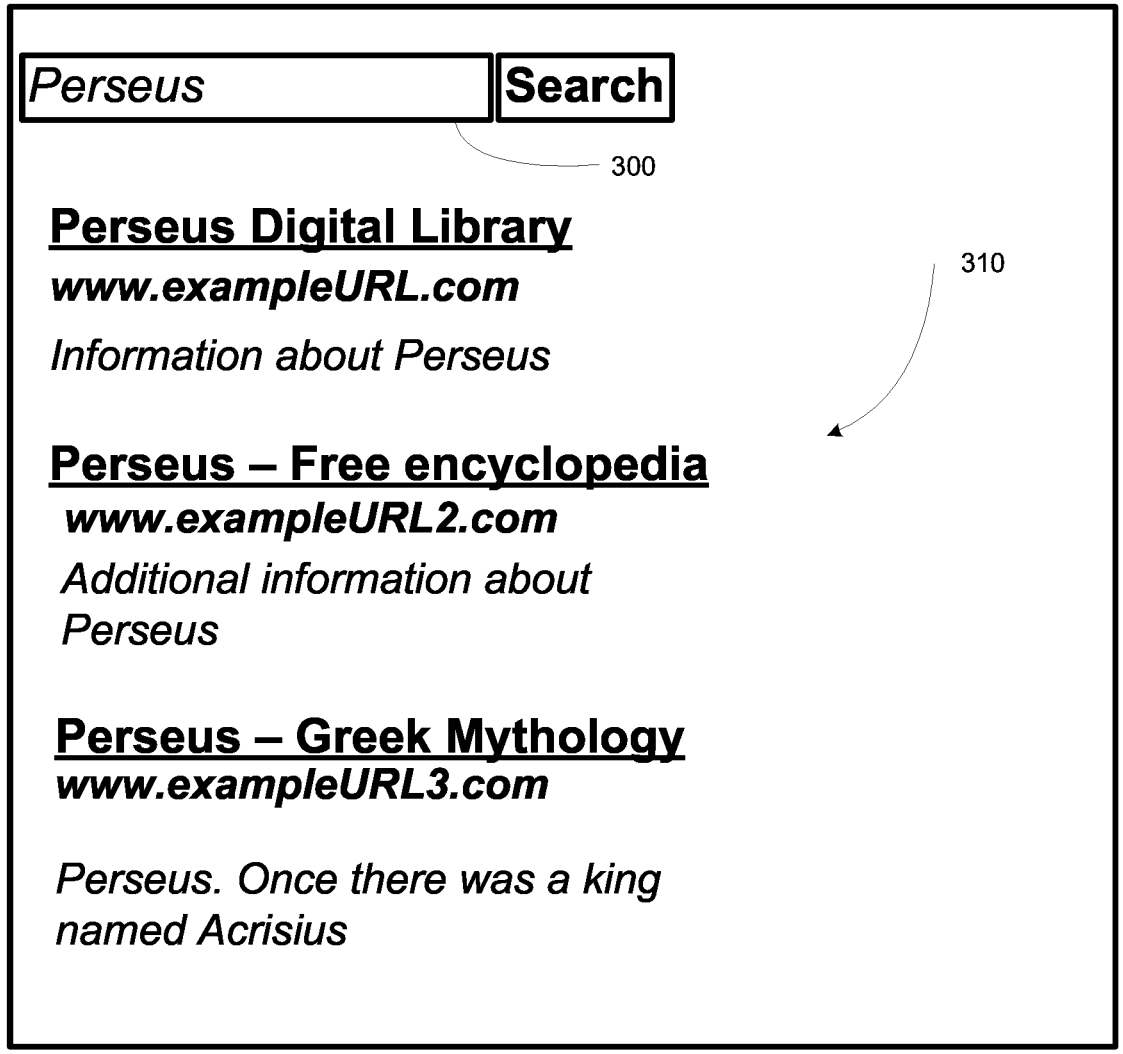
FIG. 3A illustrates another example graphical user interface for displaying search results in response to a query.
Figure 3B:
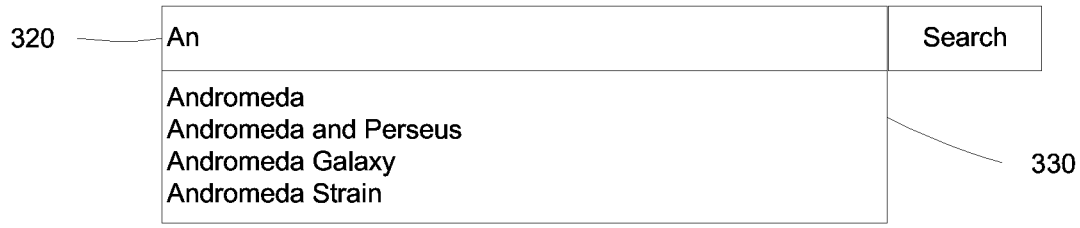
FIGS. 3B, 3C, 3D and 3E illustrate example graphical user interfaces for displaying query suggestions in response to a partial query.

FIG. 3A illustrates another example graphical user interface for displaying search results in response to a query. For example, the user may have issued a past query 300, "Perseus". The search system 160 may receive the past query 300 from the client device 110 and/or other component (e.g., entity database 120) and may return search results 310 in response to the past query 300. For example, in response to the past query 300 from the computing device 110, the search system 160 may provide a plurality of search results 310 to be displayed in the web browser 115 that is executing on the client device 110. Based on the past query "Perseus" the query session identification system 130 may identify past entities such as the entity that may be associated with the country "Greece", the entity that may be associated with the inhabitants of Greece, "Greek", and entities that may be associated with Greek mythological characters "Zeus", "Perseus", "Helena", "Acrisius", and "Andromeda", among others.

FIGS. 3B-3E illustrate example graphical user interfaces for displaying query suggestions in response to a partial query. In some implementations the query suggestion system 140 may provide query suggestions for display in and/or adjacent to a search field. For example, referring to FIG. 3B, the query suggestion system 140 may provide query suggestions 330 as a user is formulating a partial query 320 as illustrated. For example, the user may be formulating a query "An" to learn more about Andromeda. Based at least in part on the first two letters "A" and "n" of the partial query 320, the query suggestion system 140 may identify "Andromeda", "Andromeda and Perseus", "Andromeda Galaxy", and "Andromeda Strain", as candidate query suggestions. The query suggestion system 140 may rank the candidate query suggestions based on a candidate query similarity measure. The query session identification system 130 may determine that the candidate query suggestions "Andromeda" and "Andromeda and Perseus" belong to the same query session as the past query "Perseus" based at least in part on the number of shared current and past entities that may be associated with the Greek mythological characters "Andromeda", "Perseus", "Zeus", and "Helena". The candidate query suggestions may be ranked based on their respective candidate query similarity measures in the order "Andromeda", "Andromeda and Perseus", "Andromeda Galaxy" and "Andromeda Strain", with "Andromeda" being associated with the highest candidate query similarity measure and "Andromeda Strain" being associated with the lowest candidate query similarity measure. The query suggestion system 140 may select "Andromeda", "Andromeda and Perseus", "Andromeda Galaxy" and "Andromeda Strain", in that order, as query suggestions that may be provided to the user as query suggestions 330 in response to the partial query "An". The query suggestions 330 may be provided via a drop-down menu from the search box as illustrated.

Figure 3C:

Referring now to FIG. 3C, another example graphical user interface for displaying query suggestions in response to a partial query is illustrated. In response to the partial query "An" 340, the query suggestion system 140 may identify a ranked list of candidate query suggestions including, "andrew wiggins", "anthem", "ann taylor", "andromeda", "andromeda and perseus", "andromeda galaxy", and "andromeda strain", with "andrew wiggins" being associated with the highest ranking and "andromeda strain" being associated with the lowest ranking. Based at least in part on the number of shared current and past entities, the ranking system 150 may additionally rank the identified candidate query suggestions based on a candidate query similarity measure. For example, the candidate query suggestions may be ranked based on their respective candidate query similarity measures in the order "andromeda", "andromeda and perseus", "andrew wiggins", "anthem", "ann taylor", "andromeda galaxy" and "andromeda strain", with "andromeda" being associated with the highest candidate query similarity measure and "andromeda strain" being associated with the lowest candidate query similarity measure. In some implementations the ranking system 150 may adjust the ranked list of candidate query suggestions based on the candidate query similarity measures. For example, the ranking system 150 may identify "andromeda" as the highest ranked candidate query suggestion based on the candidate query similarity measure. Accordingly, the query suggestion system 140 may provide "andromeda", "andrew wiggins", "anthem", and "ann taylor" as query suggestions 350 in response to the partial query "An". As another example, "andromeda", and "andromeda and perseus" may be associated with candidate query similarity measures that are numerically very close, and the query suggestion system 140 may provide "andromeda", "andromeda and perseus", "andrew wiggins", and "anthem" as query suggestions in response to the partial query "An".

Figure 3D:
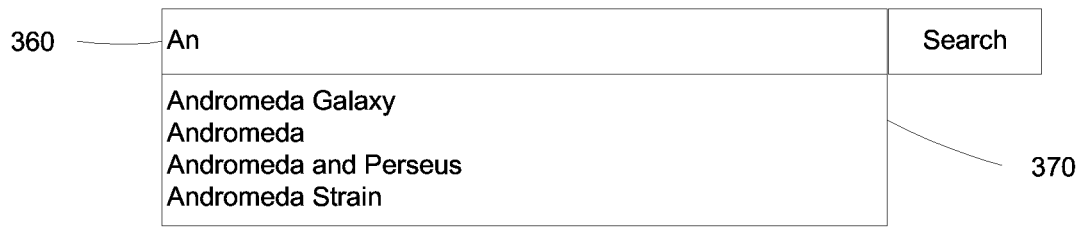

Referring now to FIG. 3D, another example graphical user interface for displaying query suggestions in response to a partial query is illustrated. In some implementations a user may have submitted a series of past queries such as "Comet", "Sagittarius", "Milky Way", "Galaxy", and "Perseus". The query session identification system 130 may identify the past queries "Comet", "Sagittarius", "Milky Way", and "Galaxy" as a first query session, and may identify that "Perseus" does not belong to the first query session. As the user formulates a partial query 360 by entering the letters "A" and "n", the query suggestion system 140 may identify candidate query suggestions including "Andromeda", "Andromeda and Perseus", "Andromeda Galaxy" and "Andromeda Strain", based at least in part on the letters typed by the user. Based on comparison of entities of the candidate query suggestion and the first query session, the ranking system 150 may determine that the candidate query similarity measure of the candidate query suggestion "Andromeda Galaxy" is more indicative of similarity to the past queries than the candidate query similarity measures for "Andromeda", "Andromeda and Perseus", and "Andromeda Strain". Likewise, the ranking system 150 may determine that the candidate query similarity measure of the candidate query suggestions "Andromeda", "Andromeda and Perseus" is more indicative of similarity to the past queries than the candidate query similarity measure for "Andromeda Strain". Based at least in part on such determinations, the query suggestion system 140 may select "Andromeda Galaxy", "Andromeda", "Andromeda and Perseus", and "Andromeda Strain", in that order, as query suggestions that may be provided to the user as query suggestions 370 in response to the partial query "An". In some implementations the query suggestions 370 may be provided via a drop-down menu from the search box as illustrated.

Figure 3E:
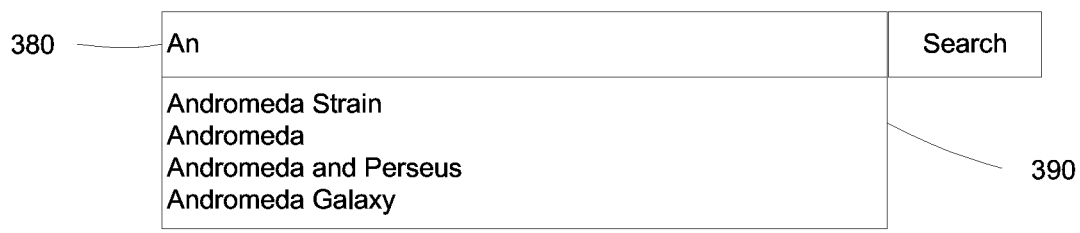

Referring now to FIG. 3E, another example graphical user interface for displaying query suggestions in response to a partial query is illustrated. In some implementations user may have submitted a past query "Andromeda". The search system 160 may receive the past query from the client device 110 and/or other component (e.g., entity database 120) and may return search results in response to the past query. For example, in response to the past query "Andromeda" from the computing device 110, the search system 160 may provide a plurality of search results to be displayed in the web browser 115 that is executing on the client device 110. The user may have selected the provided query suggestion "Andromeda Galaxy" and not having found the information that the user was looking for, the user may formulate another query "An". The query suggestion system 140 may provide the user with query suggestions including "Andromeda", "Andromeda and Perseus", "Andromeda Strain" and "Andromeda Galaxy", based at least in part on the letters typed by the user. The user may have selected "Andromeda" and not having found the information that the user was looking for, the user may formulate another query 380 such as "An". In some implementations ranking system 150 may adjust the candidate query similarity measures for the query suggestions based on such user activity. For example, such user activity may indicate that the user is not looking for information related to "Andromeda Galaxy", "Andromeda", and "Andromeda and Perseus". Based at least in part on such user activity, the query suggestion system 140 may select "Andromeda Strain", "Andromeda", "Andromeda and Perseus", and "Andromeda Galaxy", in that order, as query suggestions that may be provided to the user as query suggestions 390 in response to the partial query "An".

Referring now to FIG. 4A, a table illustrates example methods of determining cumulative entity scores. The rows are labeled by letters A through F and the columns are labeled by numbers 1 through 9. A position XY will refer to the entry in row X and column Y. Four entities $E_1$, $E_2$, $E_3$, $E_4$ are shown in column 1, and their popularity measures are illustrated in column 2. For example, entity $E_1$ at position C1 may be associated with a popularity measure 0.2 at position C2. Column 3 illustrates example entity scores for the entities related to a first past query. For example, entity score for $E_1$ related to the first past query may be $PQ_1=0.7$ at position C3. Cumulative entity scores may be determined for a given entity by aggregating the individual entity scores for an entity related to each past query. For example, the aggregate may be an average, as illustrated by the formula $ES_1=(PQ_1+PQ_3+PQ_3)/3$ at position B6. For example, the entity $E_1$ may be associated with a cumulative entity score of 0.630 at position C6, which may be determined as (0.7+0.6+0.6)/3.

In some implementations entities related to a more recent past query may be associated with a weight more indicative of relevance than the entities related to a less recent past query. For example, as indicated at position B7, the first past query may be associated with a weight $w_1$ that may be equal to 0.6, the second past query may be associated with a weight $w_2$ that may be equal to 0.8, and the most recent past query, the third past query, may be associated with a weight $w_3$ that may be equal to 1. In such instances, the cumulative entity score for an entity may be aggregated by taking a weighted average of the individual entity scores, as illustrated by the formula $ES_2=(PQ_1*w_1+PQ_3*w_2+PQ_3*w_3)/3$ at position B7. For example, the entity $E_1$ may be associated with a cumulative entity score of 0.500 at position C7, which may be determined as (0.7*0.6+0.6*0.8+0.6*1)/3.

In some implementations the cumulative entity score may be adjusted based on the popularity measure. For example, the cumulative entity score computed in Column 6 may be multiplied by the reciprocal of the popularity measure in Column 2. For example, the ranking system 150 may determine $ES_1*(1/f)$. The adjusted cumulative entity score may be optionally normalized. For example, the popularity measure for entity $E_1$ may be identified as 0.2, as illustrated at position C2. The cumulative entity score 0.630 at position C6 may be multiplied by the reciprocal of the popularity measure 0.2 to obtain 3.15. Similar determinations may be made for each of the entities $E_2$, $E_3$, and $E_4$, to obtain 0.8, 2, and 2.64 respectively. In some implementations the values 3.15, 0.8, 2, and 2.64 may be normalized. For example, their sum may be determined to 3.15+0.8+2+2.64=8.59; and each value may be divided by the sum to obtain a normalized value. For example, the adjusted cumulative entity score for $E_1$ may be determined as 3.15/8.59=0.367, as illustrated at position C8; the adjusted cumulative entity score for $E_2$ may be determined as 0.8/8.59=0.093, as illustrated at position D8; and so forth. Likewise, the cumulative entity scores $ES_2$ illustrated in Column 7, may be adjusted based on the popularity measure of the respective entity, and then normalized. Such adjusted cumulative entity scores are illustrated in Column 9.

Referring now to FIG. 4B, a table illustrates example methods of determining rankings for candidate query suggestions. The rows are labeled by letters A through G and the columns are labeled by numbers 1 through 11. A position XY will refer to the entry in row X and column Y. The query suggestion system 140 may identify candidate query suggestion $CQ_1$, $CQ_2$, . . . $CQ_{50}$ as shown in column 1. The ranking system 150 may associate each candidate query suggestion with a ranking, as illustrated in Column 2. For example, entity $CQ_1$ at position C1 may be associated with a ranking score 15 at position C2. The query session identification system 130 may identify matching entities. For example, it may be determined that the candidate query suggestion $CQ_1$ has one entity $E_4$ in common with the past entities related to the four past queries identified with reference to FIG. 4A. In some implementations for a given candidate query suggestion, each past entity $E_1$, $E_2$, $E_3$, and $E_4$, may be identified with entity scores based on whether or not the entity is a common entity related to the given candidate query suggestion. For example, for the candidate query suggestion $CQ_1$, the entity scores associated with $E_1$, $E_2$ and $E_3$ may be equal to 0 (as illustrated by the entries at positions C3, C4 and C5 respectively), indicating that these past entities are not in common with the entities related to $CQ_1$; and the entity score associated with $E_4$ may be equal to 1 (as illustrated by the entry at position C6), indicating that this past entity is in common with the entities related to $CQ_1$. Similar determinations may be made for candidate queries $CQ_2, \ldots CQ_{50}$. Other choices for the entity scores are possible. For example, each entity score may be a real number between 0 and 1 that is indicative of the strength of the relation of the entity for the given query suggestion.

In some implementations a candidate query similarity measure may be determined for each candidate query suggestion. For example, the candidate query similarity measure may be either a 1 or a 0, indicative of whether or not the candidate query suggestion shares a matching entity. In some implementations the candidate query similarity measure may be the number of matching entities. In some implementations the candidate query similarity measure may be the sum, $S_1$, of the cumulative entity scores for the matching entities. For example, the candidate query suggestion $CQ_1$ has one matching entity $E_4$. Based on the entry at position F6 in FIG. 4A, the candidate query similarity measure for $CQ_1$ may be determined to be 0.066, as illustrated at position C7 in FIG. 4B. As another example, the candidate query suggestion $CQ_2$ has two matching entities $E_1$ and $E_4$. Based on the entries at positions C6 and F6 respectively in FIG. 4A, the candidate query similarity measure for $CQ_2$ may be determined to be 0.630+0.066=0.696, as illustrated at position D7 in FIG. 4B. Column 7 in FIG. 4B illustrates example values for the candidate query similarity measures for the other candidate queries based on such determination.

In some implementations the candidate query similarity measure may be based on the adjusted similarity measure. For example, the candidate query similarity measure may be the sum, $S_2$, of the normalized values for $ES_1*(1/f)$ for the matching entities. For example, the candidate query suggestion $CQ_1$ has one matching entity $E_4$. Based on the entry at position F8 in FIG. 4A, the candidate query similarity measure for $CQ_1$ may be determined to be 0.307, as illustrated at position C8 in FIG. 4B. As another example, the candidate query suggestion $CQ_2$ has two matching entities $E_1$ and $E_4$. Based on the entries at positions C8 and F8 respectively in FIG. 4A, the candidate query similarity measure for $CQ_2$ may be determined to be 0.367+0.307=0.674, as illustrated at position D8 in FIG. 4B. Column 8 in FIG. 4B illustrates example values for the candidate query similarity measures for the other candidate queries based on such determination.

In some implementations the ranking scores associated with the candidate query suggestions may be adjusted based on the candidate query similarity measures. For example, the adjusted ranking scores for the candidate query suggestions may be determined by taking the sum of the ranking score R and the candidate query similarity measure $S_1$, as illustrated by the entries in Column 9 in FIG. 4B. The adjusted ranking for $CQ_1$ may be determined as the sum of the entries at positions C2 and C7, 15+0.066=15.066, as shown by the entry at position C9. Based on such adjusted ranking scores, the top four candidate query suggestions may be identified as $CQ_1$, $CQ_2$, $CQ_{49}$, and $CQ_{50}$. Other mathematical combinations of ranking scores and candidate query similarity measures may be utilized, including the product, a weighted average, and so forth.

In some implementations the candidate query similarity measures may be boosted, and the adjusted ranking may be based on the boosted candidate query similarity measures. For example, based on the candidate query similarity measures $S_2$ illustrated by the entries in Column 8 of FIG. 4B, the ranking system 150 may identify candidate query suggestions $CQ_{49}$ and $CQ_{50}$ as the two candidate query suggestions with the highest candidate query similarity measures 0.764 (at position F8 in FIG. 4B) and 0.907 (at position G8 in FIG. 4B), respectively. The ranking system 150 may apply a boost transformation (e.g., as represented by the formula at position B10) in FIG. 4B, to these two identified candidate query similarity measures to obtain values 8.05 (at position F10 in FIG. 4B) and 20.99 (at position G10 in FIG. 4B), respectively. The adjusted ranking score for $CQ_{49}$ may be determined as the sum of the entries at positions F2 and F10, 2+8.05=10.05, as shown by the entry at position F11. Likewise, the adjusted ranking score for $CQ_{50}$ may be determined as the sum of the entries at positions G2 and G10, 1.5+20.99=22.49, as shown by the entry at position G11. In some implementations the adjusted rankings for candidate query suggestions $CQ_{49}$ and $CQ_{50}$ may compared to the existing ranking scores for the remaining candidate query suggestions in Column 2 in FIG. 4B. Accordingly, the top four candidate query suggestions may be identified as $CQ_{50}$, $CQ_1$, $CQ_2$, and $CQ_{49}$, in the order of decreasing ranking. The ranking system 150 may optionally apply the boost transformation to each candidate query similarity measure (e.g., $S_2$) to obtain values illustrated in Column 10 of FIG. 4B. The ranking system 150 may determine adjusted ranking scores for all the candidate query suggestions as illustrated in Column 11 of FIG. 4B. Accordingly, the top four candidate query suggestions may be identified as $CQ_{50}$, $CQ_2$, $CQ_1$, and $CQ_{49}$, in the order of decreasing ranking.

While the search system 160 and the client device 110 are shown as two separate devices, in some implementations the search system 160 and the client device 110 may be the same device. For example, in some implementations a user may install a desktop search application on the client device 110. The search system 160 may be implemented as, for example, computer programs running on one or more computers in one or more locations that are coupled to each other through a network.

Likewise, while the ranking system 150 has been shown to be a separate component, in some implementations the ranking system 150 may be included in one or more of the query session identification system 130 and the query suggestion system 140. In some implementations the query session identification system 130 and the query suggestion system 140 may be optionally combined.

Figure 5:
FIG. 5 is a flow chart illustrating an example method of providing one or more query suggestions to a user in response to a current query.

Referring to FIG. 5, a flow chart illustrates an example method of providing one or more query suggestions to a user in response to a current query. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, the query session identification system 130, the query suggestion system 140, the ranking system 150, and/or the search system 160 of FIG. 1.

At step 500, a current query may be identified. In some implementation the current query may be a current query of a user. In some implementations the current query may be a partial query. For example, a user may formulate a query such as "Lu" on a web browser 115.

At step 505, one or more past queries may be identified. In some implementations the past queries may be past queries of a user that submitted the current query of step 600. In some implementations the number of past queries identified may be limited to a fixed number of past queries. For example, the query session identification system 130 may only access the past N queries. For example, the user may submit queries such as "tourism in Africa", "weather in Africa", "rivers", "rivers in Africa", and "Zambezi river". The query session identification system 130 may only access the past three queries: "rivers", "rivers in Africa", and "Zambezi river". submitted by a user. In some implementations the number of past queries identified may be limited to a fixed passage of time. For example, the query session identification system 130 may only access the past queries that were submitted within the last half hour. For example, the query session identification system 130 may access all the queries: "tourism in Africa", "weather in Africa", "rivers", "rivers in Africa", and "Zambezi river" if they were all submitted within the last half hour.

At step 510, one or more past entities related to the one or more of the identified past queries may be identified. For example, the past queries "rivers", "rivers in Africa", and "Zambezi river" may correspond to past entities that may be associated with the categories "rivers", and "rivers in Africa"; the entities that may be associated with the rivers "Zambezi river", "Kafue River", "Luapula River", "Luangwa River", and "Kalambo River"; the entity that may be associated with the continent "Africa"; the entity that may be associated with the country "Zambia"; and/or the entity that may be associated with the National Park "South Luangwa National Park", among others.

In some implementations one or more aspects of the information about the entity may be obtained from the entity database 120 by the query session identification system 130. For example, in some implementations the entity database 120 may associate each past query with one or more entities related to the past query.

At step 515, one or more candidate query suggestions may be identified that are responsive to the current query of step 600. For example, when the user enters one or more characters at step 500, the query suggestion system 140 may identify candidate query suggestions that are selected using the one or more characters. In some implementations the candidate query suggestions that are identified may include words or phrases that include the one or more characters that were entered by the user. The candidate query suggestions may also include words or phrases that are similar to (e.g., synonyms or spelling corrections of) the user input. In some implementations the candidate query suggestions may include those determined based on a list of past user queries and/or automatically generated queries. In some implementations the identified candidate query suggestions may be based on additional and/or alternative factors such as an identifier of the user who submitted the current query and/or a categorization of the user who submitted the current query.

For example, having entered past queries including "rivers", "rivers in Africa", and "Zambezi river", the user may be interested in learning more about Luapula River and may formulate a partial query "lu" at step 500. In some implementations the query suggestion system 140 may identify "Luapula River", "lululemon", "luke bryan", "lumosity", and "Luangwa River" as candidate query suggestions.

At step 520, for each candidate query suggestion, one or more current entities related to the candidate query suggestion may be identified. In some implementations the entity database 120 may contain a mapping of one or more candidate query suggestions that each have one or more current entities that may be associated therewith and the query suggestion system 140 may identify current entities from such a mapping.

For example, the candidate query suggestion "Luapula River" may be related to current entities including the entity that may be associated with the continent "Africa"; the entity that may be associated with the continent "Zambia"; the entities that may be associated with the geographical areas "Congo", "Bangweulu Swamps", and "Luapula Province"; and so forth. As another example, the current entities that may be related to the candidate query suggestion "lululemon" may include entities related to yoga attire. Also, for example, the current entities that may be related to the candidate query suggestion "luke bryan" may include entities related to the country singer Thomas Luther "Luke" Bryan. As another example, the current entities that may be related to the candidate query suggestion "lumosity" may include entities related to brain-training games and/or neuroscience.

At step 525, a given candidate query suggestion may be selected based on similarity between the one or more current entities related to the given candidate query suggestion and the one or more past entities that may be related to the identified past queries. In some implementations the query suggestion system 140 may determine a candidate query similarity measure for a given candidate query suggestion of the candidate query suggestions based on similarity between the one or more current entities related to the given candidate query suggestion and the one or more past entities that may be related to the identified past queries. A higher candidate query similarity measure may be more indicative of similarity between a past query and the given candidate query suggestion. Determination of such similarity may be based on one or more techniques described herein.

In some implementations the candidate query similarity measure may be indicative of whether or not the given candidate query suggestion has one or more matching entities in common with the past entities. If the given candidate query suggestion has one or more matching entities in common with the past entities then the candidate query similarity measure may be 1; otherwise the candidate query similarity measure may be 0.

In some implementations the candidate query suggestions may be ranked based on the candidate query similarity measures. In some implementations one or more of the candidate query suggestions may also be ranked based on one or more factors that are distinct from the candidate query similarity measure based on matching entities as described herein For example, the candidate query suggestions may be identified from a ranked list of past user queries, and/or a ranked list of automatically generated queries. The ranked list may be ranked based on factors such as an overall popularity score for the candidate query suggestions, and/or a popularity score for the candidate query suggestions for the entered query for which they are identified. Accordingly, the ranking for the candidate query suggestions may be identified from the respective ranked lists.

In some implementations the ranking of a given candidate query suggestion may be adjusted based on the candidate query similarity measure for the given candidate query suggestion. For example, candidate query suggestion $Q_1$, $Q_2$, . . . , $Q_{50}$ may be identified by the query suggestion system 140. The candidate query suggestions may be associated with ranking scores, for example, in the order of diminishing values, $r_1=0.8$, $r_2=0.75$, ..., $r_{50}=0.01$. The candidate query suggestions may be additionally associated with candidate query similarity measures $s_1=0$, $s_2=0$, ..., $s_{49}=0$, $s_{50}=1$, indicating that the candidate query suggestions $Q_1$, $Q_2$, ..., $Q_{49}$ do not have entities in common with the past entities, and candidate query suggestion $Q_{50}$ may have one or more entities in common with the past entities. Accordingly, the adjusted ranking scores may be determined by taking the sums of the respective ranking scores and candidate query similarity measures to be 0.8, 0.75, ..., 1.01, respectively. Based at least in part on such adjusted ranking scores, candidate query suggestion $Q_{50}$ may be promoted as the highest ranked query suggestion.

At step 530, the given candidate query suggestion may be provided as a query suggestion. For example, the query suggestions "luapula river", "luangwa river", luapula", and "luapula foundation" may be provided via a drop-down menu from the search box where the partial query is formulated. In some implementations the user may interact with (e.g., tap, click, or otherwise affirmatively select) one of the provided query suggestions to select the query suggestion.

Figure 6:
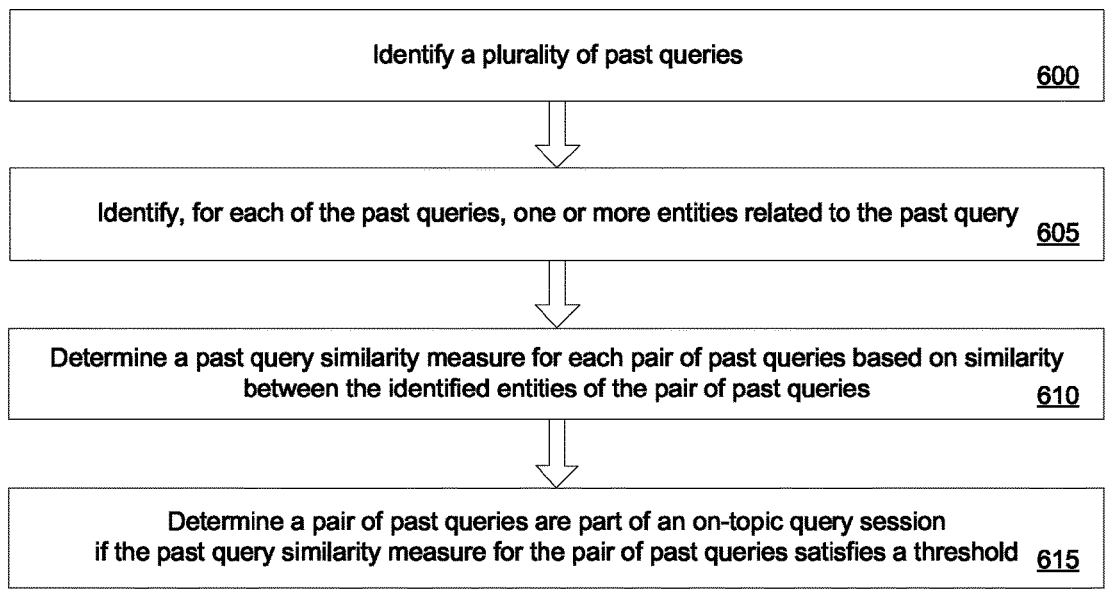
FIG. 6 is a flow chart illustrating an example method of identifying an on-topic query session.

Referring to FIG. 6, a flow chart illustrates an example method of identifying an on-topic query session. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, the query session identification system 130, the query suggestion system 140, the ranking system 150, and/or the search system 160 of FIG. 1.

At step 600, a plurality of past queries of a user may be identified. In some implementations the number of past queries identified may be limited to a fixed number of past queries. In some implementations the number of past queries stored may be limited to a fixed passage of time. For example, the query session identification system 130 may only access the past queries that were submitted within the last half hour. For example, the query session identification system 130 may access all the queries: "tourism in Africa", "weather in Africa", "rivers", "rivers in Africa", and "Zambezi river" if they were all submitted within the last half hour. Step 600 may share one or more aspects in common with step 505 of FIG. 5.

At step 605, for each of the past queries, one or more entities related to the past query may be identified. In some implementations, the query suggestion system 140 may identify one or more past entities that may be related to a past query based on the search results and/or search result documents generated in response to a submitted query. For example, "Zeus" may appear in a search result snippet in the search results generated in response to the submitted query "perseus".

In some implementations the entity database 120 may include an index of queries and associated entities and the query session identification system 130 may identify the entities from the index. For example, for each query, a mapping (e.g., data defining an association) between the query and one or more entities related with the query may be identified in the entity database 120. In some implementations one or more entities that may be related to a received query may be identified from such a mapping.

At step 610, a past query similarity measure between a pair of past queries $Q_1$ and $Q_2$ may be determined based on the number of shared entities (e.g., entities that are common to both the past queries $Q_1$ and $Q_2$) between the past entities of $Q_1$ and $Q_2$. A higher number of shared entities between the past entities of $Q_1$ and $Q_2$ may be more indicative of similarity between the past queries $Q_1$ and $Q_2$ than a lower number of shared entities between the past entities of $Q_1$ and $Q_2$. For example, the first past query $Q_1$ may be related to past entities $E_{11}$, $E_{12}$, and $E_{13}$, with entity scores $S_{11}$, $S_{12}$, and $S_{13}$, respectively. The second past query $Q_2$ may be related to past entities $E_{21}$, $E_{22}$, $E_{23}$, and $E_{24}$, with entity scores $S_{21}$, $S_{22}$, $S_{23}$, and $S_{24}$, respectively. In a first scenario, entities $E_{12}$ and $E_{13}$ related to the past query $Q_1$ may be the same as entities $Q_{23}$ and $Q_{24}$ related to the past query $Q_2$. In a second scenario, entity $E_{12}$ related to the past query $Q_1$ may be the same as entity $E_{23}$ related to the past query $Q_2$. Accordingly, a past query similarity measure more indicative of similarity may be associated with $Q_1$ and $Q_2$ in the first scenario than in the second scenario.

At step 615, a pair of past queries may be determined to be a part of an on-topic query session if the past query similarity measure satisfies a threshold. An on-topic query session is a plurality of queries that may be related to one or more similar topics. Past queries may be identified as part of an on-topic query session if the past query similarity measure satisfies a threshold. For example, the past query similarity measure may be a score from 0 to 1 and the threshold for the past query similarity measure may be 0.85. A pair of past queries that have a past query similarity measure more than 0.85 may be identified as part of an on-topic query session. On the other hand, a pair of past queries that have a past query similarity measure less than 0.85 may be identified as part of different on-topic query sessions. For example, past queries "rivers in africa" and "Zambezi river" may be associated with a past query similarity measure 0.92, based at least in part on comparison of the past entities related to the past queries. Having satisfied the threshold of 0.85, these past queries may be identified as part of an on-topic query session. As another example, past queries "zeus" and "andromeda" may be associated with a past query similarity measure 0.95, based at least in part on comparison of the past entities related to the past queries. Having satisfied the threshold of 0.85, these past queries may be identified as part of an on-topic query session. Past queries "zeus" and "rivers in africa" may be associated with a past query similarity measure 0.15, based at least in part on past entities related to the past queries. Having failed to satisfy the threshold of 0.85, these past queries may not be identified as part of an on-topic query session.

For example, the query session identification system 130 may group the past queries into one or more on-topic query sessions. For example, the user may have submitted past queries in the following order: "perseus", "zeus", "rivers", "rivers in Africa", "Zambezi river", "helena", and "Andromeda". The past queries "perseus", "zeus", "helena", and "Andromeda" may be identified as a first on-topic query session based on one or more techniques described herein. The past queries "rivers", "rivers in Africa", and "Zambezi river" may be identified as a second on-topic query session. In some implementations the second on-topic query session including "rivers", "rivers in Africa", and "Zambezi river" may be identified as an intervening on-topic query session with respect to the first on-topic query session including "perseus", "zeus", "helena", and "Andromeda". In some implementations one or more on-topic query sessions may be stored with time stamp data, and/or a list of intervening on-topic query sessions. In some implementations the past queries within each on-topic query session may be optionally ranked. In some implementations the ranking may be based on the order in which the past queries were submitted by the user.

Figure 7:
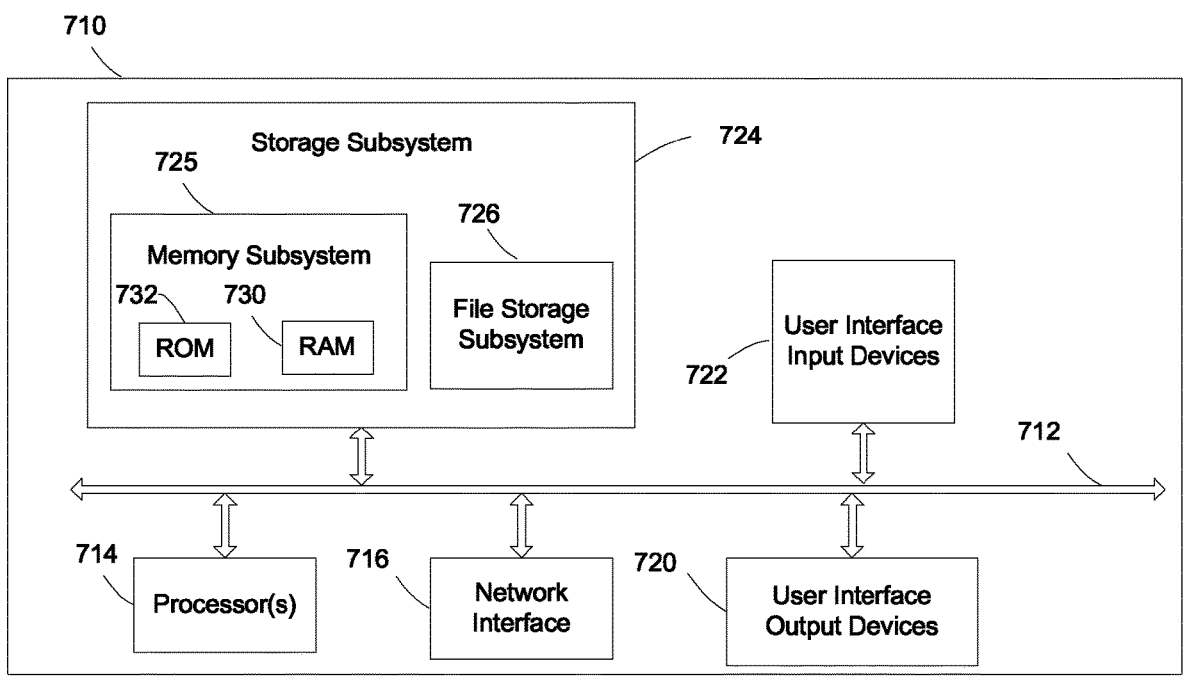
FIG. 7 illustrates an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to associate a query with at least one entity; provide one or more search results for a query; and/or identify a query suggestion based on a query to entity association.

These software modules are generally executed by processor 714 alone or in combination with other processors. Memory 725 used in the storage subsystem may include a number of memories including a main random access memory (RAM) 730 for storage of instructions and data during program execution and a read only memory (ROM) 732 in which fixed instructions are stored. A file storage subsystem 724 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 724 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 may be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

It should also be understood that, unless clearly indicated to the contrary, in any methods claimed herein that include more than one step or act, the order of the steps or acts of the method is not necessarily limited to the order in which the steps or acts of the method are recited.

What is claimed is:
1. A method, comprising:
identifying a current query of a user;
identifying a group of past queries of the user, wherein the past queries were issued by the user prior to the current query and wherein identifying the group of the past queries comprises identifying the past queries for inclusion in the group based on at least one of:
   the past queries of the group being submitted within a threshold amount of time relative to the current query, and
   the past queries of the group each being within a threshold quantity of most recent query submissions relative to the current query;
identifying one or more past entities based on the past entities being related to one or more of the identified past queries of the group, including identifying a given past entity of the one or more past entities based on the given past entity being stored in association with the past queries of the group, the given past entity being in addition to any of the terms of the past queries of the group;
identifying one or more candidate query suggestions for the current query of the user;
identifying, for each candidate query suggestion of the candidate query suggestions, one or more current entities related to the candidate query suggestion;

selecting a given candidate query suggestion of the candidate query suggestions based on similarity between the one or more current entities related to the given candidate query suggestion and the one or more past entities related to the identified past queries of the group;

providing the given candidate query suggestion for presentation to the user as a query suggestion.

2. The method of claim 1, further comprising determining whether the past queries of the group are part of an on-topic query session.

3. The method of claim 2, wherein selecting the given candidate query suggestion of the candidate query suggestions based on similarity between the one or more current entities related to the given candidate query suggestion and the one or more past entities related to the identified past queries only occurs if the past queries are determined to be part of an on-topic query session.

4. The method of claim 2, wherein determining the past queries are part of an on-topic query session includes:
identifying, for each of the past queries, one or more entities related to the past query;
determining a similarity measure among the past queries based on similarity between the identified entities of the past queries; and
determining the past queries are part of an on-topic query session if the similarity measure satisfies a threshold.

5. The method of claim 4, wherein the identified entities for a first past query of the past queries include one or more of the same entities as the identified entities for a second query of the past queries.

6. The method of claim 1, further comprising determining, for each of the past entities, a cumulative ranking of the past entity based on a ranking of the past entity for each of the past queries.

7. The method of claim 6, wherein selecting the given candidate query suggestion of the candidate query suggestions includes identifying at least one matching entity between the past entities and the current entities and determining a query suggestion ranking of the given candidate query suggestion based on the cumulative ranking of the matching entity.

8. The method of claim 6, wherein determining the cumulative ranking of the past entities based on the ranking of the past entities for each of the past queries includes weighting the ranking of the past entities for more recent of the past queries greater than the ranking of the past entities for less recent of the past queries.

9. The method of claim 6, wherein the ranking of each of the past entities for each of the past queries is based on a weighting of the past entity in search result documents responsive to the past query.

10. The method of claim 6, wherein the cumulative ranking of each of the past entities is based on an overall popularity measure of the past entity indicative of overall popularity of the past entity; wherein as the popularity measure becomes less indicative of popularity the cumulative ranking increases.

11. The method of claim 1, wherein the past entities are identified from a query to entity mapping.

12. The method of claim 1, wherein the current entities are identified from a query to entity mapping.

13. The method of claim 1, wherein the past queries immediately precede the current query.

14. A system including memory and one or more processors operable to execute instructions, stored in the memory, including instructions to perform the operations of:

identifying a current query of a user;
identifying a group of past queries of the user, wherein the past queries were issued by the user prior to the current query and wherein identifying the group of the past queries comprises identifying the past queries for inclusion in the group based on at least one of:
the past queries of the group being submitted within a threshold amount of time relative to the current query, and
the past queries of the group each being within a threshold quantity of most recent query submissions relative to the current query;
identifying one or more past entities based on the past entities being related to one or more of the identified past queries of the group, including identifying a given past entity of the one or more past entities based on the given past entity being stored in association with the past queries of the group, the given past entity being in addition to any of the terms of the past queries of the group;
identifying, for each candidate query suggestion of the candidate query suggestions, one or more current entities related to the candidate query suggestion;
selecting a given candidate query suggestion of the candidate query suggestions based on similarity between the one or more current entities related to the given candidate query suggestion and the one or more past entities related to the identified past queries of the group; and
providing the given candidate query suggestion for presentation to the user as a query suggestion.

15. The system of claim 14, wherein the instructions further include instructions to perform the operation of determining whether the past queries are part of an on-topic query session.

16. The system of claim 15, wherein selecting the given candidate query suggestion of the candidate query suggestions based on similarity between the one or more current entities related to the given candidate query suggestion and the one or more past entities related to the identified past queries only occurs if the past queries are determined to be part of an on-topic query session.

17. The system of claim 15, wherein the instructions to perform the operation of determining the past queries are part of an on-topic query session further include instructions to perform the operation of:
identifying, for each of the past queries, one or more entities related to the past query;
determining a similarity measure among the past queries based on similarity between the identified entities of the past queries; and
determining the past queries are part of an on-topic query session if the similarity measure satisfies a threshold.

18. The system of claim 14, wherein the instructions further include instructions to perform the operation of determining, for each of the past entities, a cumulative ranking of the past entity based on a ranking of the past entity for each of the past queries.

19. The system of claim 18, wherein the instructions to perform the operation of selecting the given candidate query suggestion of the candidate query suggestions further include instructions to perform the operation of identifying at least one matching entity between the past entities and the current entities and determining a query suggestion ranking of the given candidate query suggestion based on the cumulative ranking of the matching entity.

20. The system of claim 18, wherein the instructions to perform the operation of determining the cumulative ranking of the past entities based on the ranking of the past entities for each of the past queries further include instructions to perform the operation of weighting the ranking of the past entities for more recent of the past queries greater than the ranking of the past entities for less recent of the past queries.

21. The system of claim 18, wherein the cumulative ranking of each of the past entities is based on an overall popularity measure of the past entity indicative of overall popularity of the past entity; wherein as the popularity measure becomes less indicative of popularity the cumulative ranking increases.

22. The system of claim 14, wherein the past entities are identified from a query to entity mapping.

23. The system of claim 14, wherein the current entities are identified from a query to entity mapping.

24. A non-transitory computer readable storage medium storing computing device instructions executable by a processor to perform a method comprising:

identifying a current query of a user;

identifying a group of past queries of the user, wherein the past queries were issued by the user prior to the current query and wherein identifying the group of the past queries comprises identifying the past queries for inclusion in the group based on at least one of:

the past queries of the group being submitted within a threshold amount of time relative to the current query, and the past queries of the group each being within a threshold quantity of most recent query submissions relative to the current query;

identifying one or more past entities based on the past entities being related to one or more of the identified past queries of the group, including identifying a given past entity of the one or more past entities based on the given past entity being stored in association with the past queries of the group, the given past entity being in addition to any of the terms of the past queries of the group;

identifying one or more candidate query suggestions for the current query of the user;

identifying, for each candidate query suggestion of the candidate query suggestions, one or more current entities related to the candidate query suggestion;

selecting a given candidate query suggestion of the candidate query suggestions based on similarity between the one or more current entities related to the given candidate query suggestion and the one or more past entities related to the identified past queries of the group; and providing the given candidate query suggestion for presentation to the user as a query suggestion.

* * * * *